US008285074B2

(12) United States Patent
Saund et al.

(10) Patent No.: US 8,285,074 B2
(45) Date of Patent: Oct. 9, 2012

(54) FINDING LOW VARIANCE REGIONS IN DOCUMENT IMAGES FOR GENERATING IMAGE ANCHOR TEMPLATES FOR CONTENT ANCHORING, DATA EXTRACTION, AND DOCUMENT CLASSIFICATION

(75) Inventors: Eric Saund, San Carlos, CA (US); Prateek Sarkar, Sunnyvale, CA (US); Alejandro E. Brito, Mountain View, CA (US); Marshall W. Bern, San Carlos, CA (US); Francois Ragnet, Venon (FR)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 20 days.

(21) Appl. No.: 12/873,657

(22) Filed: Sep. 1, 2010

(65) Prior Publication Data
US 2012/0051649 A1    Mar. 1, 2012

(51) Int. Cl.
*G06K 9/20* (2006.01)
*G06K 9/62* (2006.01)
(52) U.S. Cl. .................. 382/282; 382/225; 382/209
(58) Field of Classification Search .................. 382/282, 382/283, 294, 209, 217, 218, 224, 225, 226, 382/100, 195
See application file for complete search history.

(56) References Cited

U.S. PATENT DOCUMENTS

| 6,741,738 | B2* | 5/2004 | Taylor | 382/187 |
| 6,968,085 | B2 | 11/2005 | Bern et al. | |
| 8,086,039 | B2 | 12/2011 | Kletter | |
| 8,144,947 | B2 | 3/2012 | Kletter | |
| 2004/0133536 | A1* | 7/2004 | Uceda-Sosa | 707/1 |
| 2007/0165904 | A1* | 7/2007 | Nudd et al. | 382/100 |
| 2009/0324100 | A1 | 12/2009 | Kletter et al. | |
| 2011/0280451 | A1 | 11/2011 | Sarkar | |
| 2011/0280490 | A1 | 11/2011 | Sarkar | |
| 2011/0311145 | A1 | 12/2011 | Bern et al. | |

OTHER PUBLICATIONS

Amit, Yali, et al., Shape Quantization and Recognition with Randomized Trees, Neural Computation, 9(7): 1545-1588, Oct. 1997.
Huttenlocher, Daniel P., et al., A Multi-Resolution Technique for Comparing Images Using the Hausdorff Distance, TR 92/1321,Cornell University, Dec. 1992.
Jung, Dz-Mou, et al., N-Tuple Features for OCR Revisited, IEEE Transactions on Pattern Analysis and Machine Intelligence, 18(7): 734-745, Jul. 1996.
Rucklidge, William, Efficient Visual Recognition Using the Hausdorff Distance, Springer-Verlag New York, Inc., Secaucus, NJ, 1996.
Sarkar, Prateek, Image Classification: Classifying Distributions of Visual Features, The 18th International Conference on Pattern Recognition, Hong Kong, pp. 1-4, IEEE, 2006.

(Continued)

*Primary Examiner* — Yon Couso
(74) *Attorney, Agent, or Firm* — Fay Sharpe LLP

(57) ABSTRACT

Methods of generating image anchor templates from low variance regions of document images of a first class are provided. The methods select a document image from the document images of the first class and align the other document images of the first class to the selected document image. Low variance regions are then determined by comparing the aligned document images and the selected document image and used to generate image anchor templates.

16 Claims, 16 Drawing Sheets

OTHER PUBLICATIONS

Spitz, Lawrence, Shape-based Word Recognition, International Journal on Document Analysis and Recognition, 1(4): 178-190, Springer-Verlag, May 1999.

Yuille, Alan L., et al., Feature Extraction from Faces Using Deformable Templates, Computer Vision and Pattern Recognition, Harvard Robotics Laboratory Division of Applied Sciences, Harvard University, pp. 104-109, IEEE 1989.

Brunelli, Roerto, Template Matching Techniques in Computer Vision, Wiley (UK), 2009.

* cited by examiner

800

PTO/SB/03A (07-07)
Approved for use through 06/30/2010. OMB 0651-0032
U.S. Patent and Trademark Office; U.S. DEPARTMENT OF COMMERCE
Under the Paperwork Reduction Act of 1995, no persons are required to respond to a collection of information unless it displays a valid OMB control number.

DECLARATION (37 CFR 1.63) FOR PLANT APPLICATION USING AN APPLICATION DATA SHEET (37 CFR 1.76)

| Title of Invention | |
|---|---|

As the below named inventor(s), I/we declare that:

This declaration is directed to:

☐ The attached application, or

☐ Application No. _____ filed on _____,

☐ as amended on _____ (if application);

I/we believe that I/we am/are the original and first inventor(s) of the new and distinct variety of plant which is claimed and for which a plant patent is sought;

I/we have asexually reproduced the plant to which this application applies;

☐ The plant was found in a cultivated area (check this box for a newly found plant only);

FROM FIG. 8A 802
806 — I/we have reviewed and understand the contents of the above-identified application, including the claims, as amended by any amendment specifically referred to above;

804 — I/we acknowledge the duty to disclosure to the United State Patent and Trademark Office all information known to me/us to be material to patentability as defined in 37 CFR 1.56, including for continuation-in-part applications, material information which became available between the filing date of the prior application and the national or PCT International filing date of the continuation-in-part.

WARNING:
Petitioner/applicant is cautioned to avoid submitting personal information in documents filed in a patent application that may contribute to identity theft. Personal information such as social security numbers, bank account numbers, or credit card numbers (other than a check or credit card authorization form PTO-2038 submitted for payment purposes) is never required by the USPTO to support a petition or an application. If this type of personal information is included in documents submitted to the USPTO, petitioners/applicants should consider redacting such personal information from the documents before submitting them to the USPTO. Petitioner/applicant is advised that the record of a patent application is available to the public after publication of the application (unless a non-publication request in compliance with 37 CFR 1.213(a) is made in the application) or issuance of a patent. Furthermore, the record from an abandoned application may also be available to the public if the application is referenced in a published application or an issued patent (see 37 CFR 1.14). Checks and credit card authorization forms PTO-2038 submitted for payment purposes are not retained in the application file and therefore are not publicly available.

All statements made herein of my/our own knowledge are true, all statements made herein on information and belief are believed to be true, and further that these statements were made with the knowledge that willful false statements and the like are punishable by fine or imprisonment, or both, under 18 U.S.C. 1001, and may jeopardize the validity of the application or any patent issuing thereon.

FULL NAME OF INVENTOR(S)

Inventor one: _____ Date: _____

Signature: _____ Citizen of: _____

☐ Additional inventors or a legal representative are being named on _____ additional form(s) attached hereto.

This collection of information is required by 37 U.S.C. 115 and 37 CFR 1.63. The information is required to obtain or retain a benefit by the public which is to file (and by the USPTO to process) an application. Confidentiality is governed by 35 U.S.C. 122 and 37 CFR 1.11 and 1.14. This collection is estimated to take 1 minutes to complete, including gathering, preparing, and submitting the completed application form to the USPTO. Time will vary depending upon the individual case. Any comments on the amount of time you require to complete this form and/or suggestions for reducing this burden, should be sent to the Chief Information Officer, U.S. Patent and Trademark Office, U.S. Department of Commerce, P.O. Box 1450, Alexandria, VA 22313-1450. DO NOT SEND FEES OR COMPLETED FORMS TO THIS ADDRESS. SEND TO: Commissioner for Patents, P.O. Box 1450, Alexandria, VA 22313-1450.
*If you need assistance in completing the form, call 1-800-PTO-9199 and select option 2.*

FIG. 8B

FINDING LOW VARIANCE REGIONS IN DOCUMENT IMAGES FOR GENERATING IMAGE ANCHOR TEMPLATES FOR CONTENT ANCHORING, DATA EXTRACTION, AND DOCUMENT CLASSIFICATION

BACKGROUND

The present exemplary embodiments disclosed herein relate generally to the generation of image anchor templates. They find particular application in conjunction with the generation of image anchor templates, from low variance regions of document images of a first class, for content anchoring, data extraction and document classification, and will be described with particular reference thereto. However, it is to be appreciated that the present exemplary embodiments are also amenable to other like applications.

When dealing with a large number of documents, it is often desirable to quickly extract data from the documents. Typical solutions often rely upon template matching techniques to locate image anchor templates within a document image of a document for content anchoring. The idea being that if one can locate one or more image anchor templates within a document image, one can determine the location of a data field within the document image based upon its relative location to the image anchor templates.

To illustrate, consider the problem of identifying the address and social security number fields in a document. Even if the document is fixed, the processes of printing, faxing, and scanning the document introduce distortions into document images of the document. Therefore, the relevant fields cannot be found at fixed displacement from boundaries into the document images of the document. Rather they need to be located with respect to fixed content in the document images. It is this fixed content that defines image anchor templates.

In view of the foregoing illustration, it should be appreciated that one important aspect of typical solutions is that they depend upon the ability of the image anchor templates to offer relatively fixed points of reference from which to determine a data field. Consequently, image anchor templates are chosen such that they can be localized with a high degree of reliability and robustness. That is to say, image anchor templates are chosen for their ability to reliably provide a fixed point of reference within a document image of a document.

In choosing image anchor templates, typical solutions rely upon an operator to manually select image anchor templates that can reliably act as anchoring points. To aid operators, there are many user interface tools designed to help operators, especially in massive data processing scenarios. These typically allow operators to select regions of interest in exemplar document images with the aim of cropping the selected regions and using them as image anchor templates. Nevertheless, regardless of whether operators are aided with a user interface, typical solutions still rely upon the skill and intuition of an operator to generate the image anchor templates.

This reliance on an operator, however, may lead to sub-par image anchor templates and/or a waste of time and resources due to the difficulty of picking image anchor templates. Namely, visual elements easily located by the human eye are not necessarily good candidates for image anchor templates. The converse also holds true. For example, think of different barcodes to indicate different fields. Even more, it is difficult for an operator to predict how a particular image anchor template will match to different document images and/or whether an image anchor template will reliably offer an anchor point across multiple documents. As a result of these difficulties, an operator will generally have to undergo a trial and error process that takes time and resources.

In addition to data extraction, it is often desirable to quickly classify documents when dealing with a large number of documents. Typical solutions work by matching one or more manually generated image anchor templates to document images corresponding to documents. If the image anchor templates sufficiently match a document image, the classification of the corresponding document is known.

One important aspect of such solutions is that they depend upon the ability of the image anchor templates to discriminate between documents of different classes. Consequently, image anchor templates are chosen for their discriminative power. That is to say, image anchor templates are chosen for their ability to differentiate between documents of different classes.

In choosing image anchor templates, typical solutions rely upon an operator to manually select the image anchor templates to discriminate between document images of a particular class and document images of other classes. Put another way, these solutions rely upon the skill and intuition of an operator to generate the image anchor templates. However, this reliance on an operator may lead to sub-par image anchor templates and/or a waste of time and resources due to the difficulty of picking image anchor templates.

As noted above, it is difficult for an operator to predict how a particular image anchor template will match to different document images. Even more, it is difficult for an operator to find image anchor templates that are not likely to match document images of a different class. This is especially true if documents to be considered have fixed and variable parts and/or share parts with documents of other classes. Such is the case in institutional forms, letter heads, invoices, etc. As a result of these difficulties, an operator will generally have to undergo a trial and error process that takes time and resources.

In view of the deficiencies noted above, there exists a need for improved systems and/or methods of generating image anchor templates. The present application contemplates such new and improved systems and/or methods which may be employed to mitigate the above-referenced problems and others.

INCORPORATION BY REFERENCE

The disclosures of U.S. patent application Ser. No. 12/780,387 for "Learning image templates for content anchoring and data extraction," by Prateek Sarkar, filed May 14, 2010 (now U.S. Publication No. US-2011-0280490-A1, published Nov. 17, 2011; U.S. patent application Ser. No. 12/780,317 for "Learning image anchor templates for document classification," by Prateek Sarkar, filed May 14, 2010 (now U.S. Publication No. US-2011-0280451-A1 published Nov. 17, 2011; U.S. patent application Ser. No. 09/950,205 for "Document matching and annotation lifting," by Bern et al., filed Sep. 10, 2001 (now U.S. Pat. No. 6,968,085, issued Mar. 13, 2003; and U.S.) Publication No. US-2011-0311145-A1, published Dec. 22, 2011, for "Clean document reconstruction from annotated document images," by Bern et al., are each hereby incorporated herein in their entireties.

BRIEF DESCRIPTION

According to an aspect of the present application, a method is provided for generating image anchor templates from low variance regions of document images of a first class. A document image from the document images of the first class is selected and the other document images of the first class are aligned to the selected document image. Low variance regions are then determined by comparing the aligned document images and the selected document image and used to generate image anchor templates.

According to another aspect of the present application, a method is provided for generating image anchor templates from a clean document image generated from document images of a first class. A document image from the document images of the first class is selected and the other document images of the first class are aligned to the selected document image. Thereafter, the aligned document images and the selected document image are combined into a clean document image, which is used to generate image anchor templates.

According to another aspect of the present application, a system is provided for generating image anchor templates from low variance regions of document images of a first class. The system includes a selection module, an alignment module, a variance module and an image anchor template module. The selection module selects a document image from the document images of the first class and the alignment module aligns the other document images of the first class to the selected document image. The variance module compares the aligned document images and the selected document image to determine the low variance regions. The Image anchor template module generates image anchor templates from the determined low variance regions.

BRIEF DESCRIPTION OF THE DRAWINGS

FIG. 8 illustrates a template source;

DETAILED DESCRIPTION

The systems and methods, discussed in detail hereafter, pertain to systems and methods for generating image anchor templates from low variance regions of document images of a first class. Example applications of image anchor templates include, but are not limited to, content anchoring, data extraction and document classification.

Figure 1:
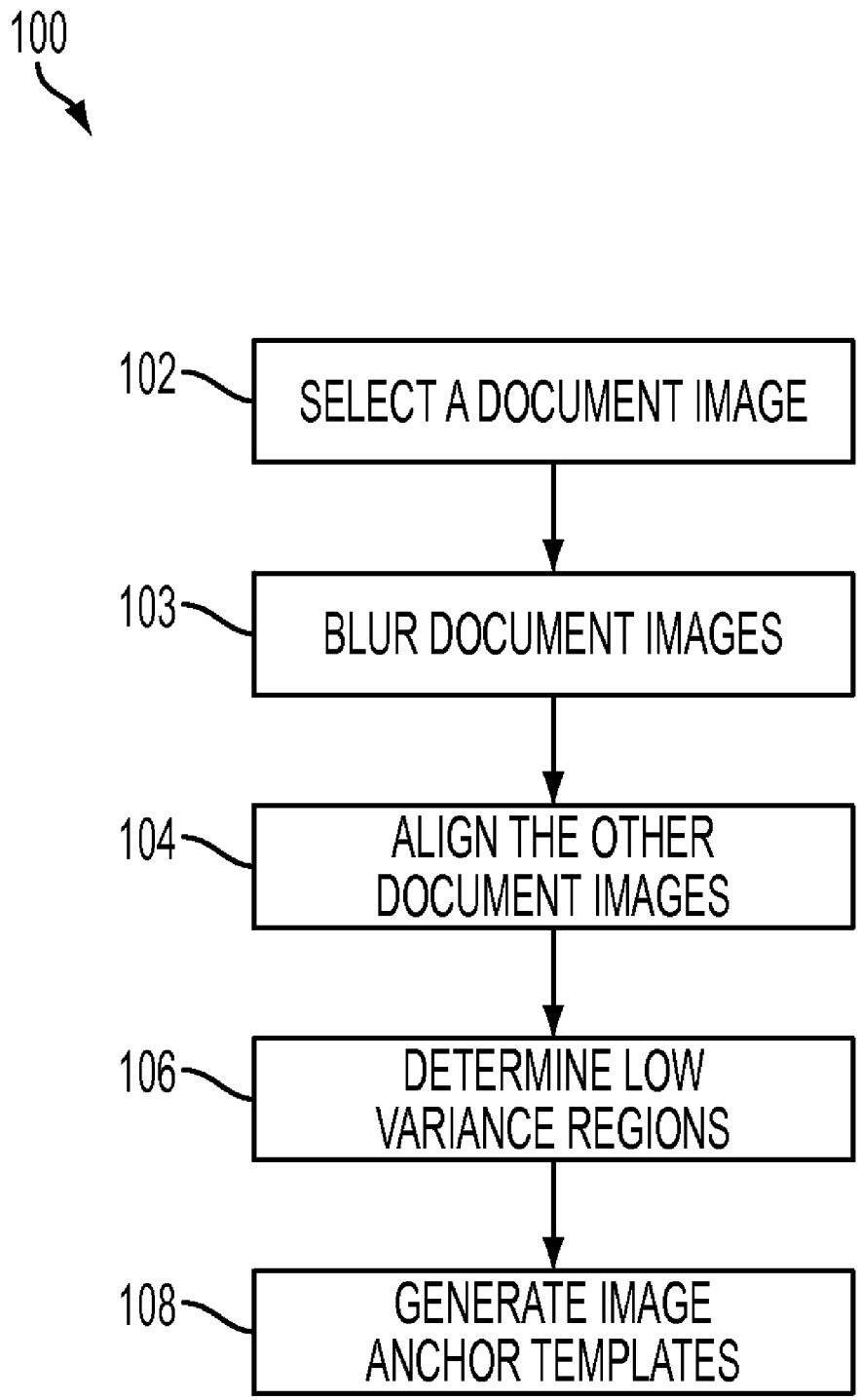
FIG. 1 illustrates a method for generating image anchor templates from low variance regions of document images of a first class.

With reference to FIG. 1, a method 100 for generating image anchor templates from low variance regions of document images of a first class is illustrated. A document image is, as its name would suggest, merely an image of a physical document. Documents may, but need not be, converted to document images through the use of an imaging device, such as a scanner, camera, etc. A class of document images is a collection of document images of the same type. For example, a class of document images might include different instances of the same form. In certain embodiments, document images are defined as belonging to the same type if they share at least a certain proportion (for example, 50%) of pixels in common. The method 100 includes selecting a document image (Action 102), aligning the other document images (104), determining low variance regions (Action 106) and generating image anchor templates (Action 108). Optionally, the method 100 further includes blurring the document images (Action 103).

The method 100 begins by selecting a document image from the document images of the first class (Action 102). No particular selection scheme needs to be used. However, in certain embodiments, the document image is selected randomly from the document images of the first class. Alternatively, in other embodiments, the best document image from the collection of document images is selected. In this context, "best" or "closest" refers to the quality of a document image relative to its document. Considerations include, but are not limited to, the amount of skew, the quality of fixed text, the readability of the document image, crispness, line quality, etc. The skew of a document image is generally given more weight than the crispness or line quality of the document image. The best document image may be determined by a machine, by an operator, or by some combination of a machine and an operator.

After selecting the best document image (Action 102), the document images, including the best document image, are optionally blurred (Action 103). Any suitable blurring algorithm may be used. For example, certain embodiments implement the well-known Gaussian blur algorithm to blur the document images. In other embodiments, the black pixels of the document images are dilated. Dilation denotes the operation where the value of the output pixel is the maximum value of all the pixels in the input pixel's neighborhood. For example, in a binary image, if any of pixels in the input pixel's neighborhood are black, the output pixel is set to black. The purpose of blurring is to ensure that even relatively small objects, such as periods and lines of one or two pixels width can be aligned.

Regardless of whether blurring is performed (Action 103), each of the other document images of the first class are aligned to the selected document image next (Action 104). Aligning the other document images may include globally aligning the other document images and/or locally aligning the other document images. Global alignment transforms a document image to best match the selected document image and local alignment translates individual sub-regions of the document image to best match corresponding sub-regions of the selected document image.

Figure 2:
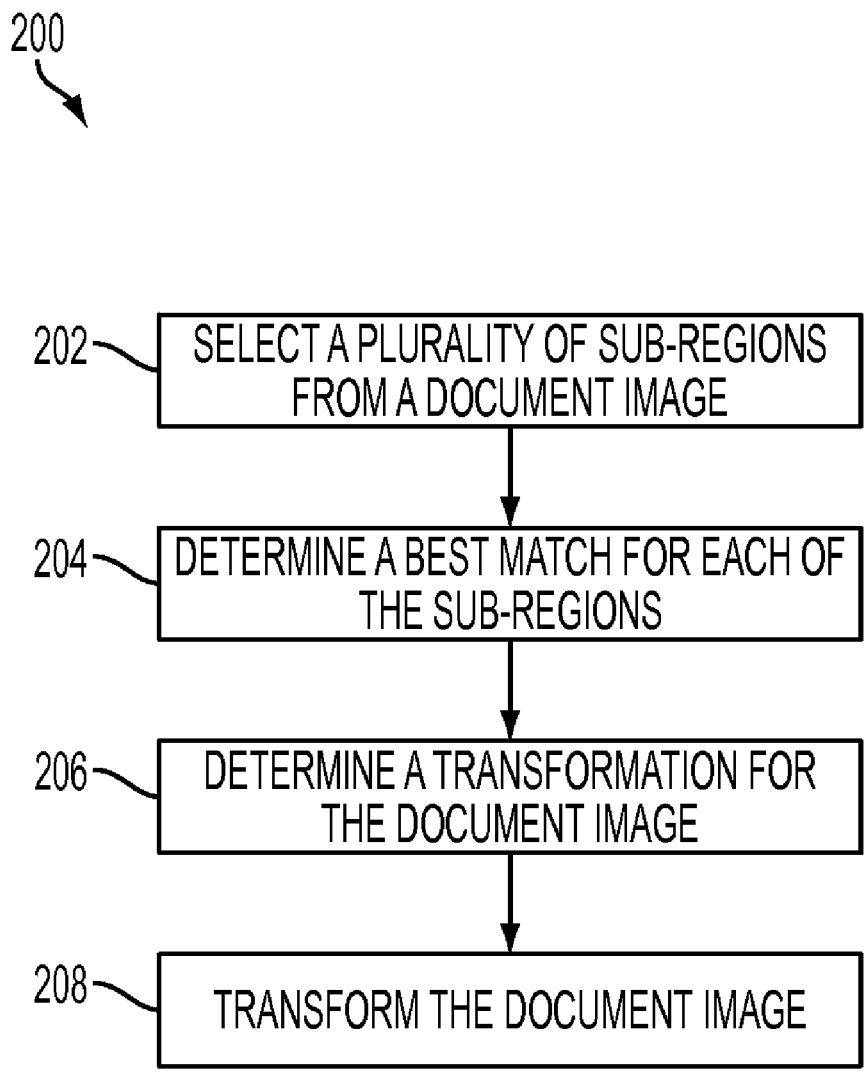
FIG. 2 illustrates a method for globally aligning a document image to a selected document image.

With reference to FIG. 2, a method 200 for globally aligning a document image to a selected document image is illustrated. The method 200 includes selecting a plurality of sub-regions from the document image (Action 202), determining a best match for each of the selected sub-regions (Action 204), determining a transformation for the document image (Action 206) and transforming the document image (Action 208).

To begin, a plurality of sub-regions (or initial blocks) are selected from the document image (Action 202). In general the small distributed blocks occupy an area which is about 5% or less of the area of the document image. In certain embodiments, thirty or more sub-regions are selected. Additionally, in certain embodiments, the sub-regions are at least one of uniformly sized, non-overlapping, and uniformly distributed across the document image. For a 300 DPI document image, a sub-region will typically have a size of 128×128 pixels. The sub-regions may, but need not, be selected at random, selected pseudo randomly, or selected by an operator. In embodiments where the sub-regions are selected pseudo randomly, the sub-regions may be selected with the aid of an operator and/or selected so as to meet certain conditions.

After the sub-regions are selected from the document image (Action 202), a best match is determined for each of the sub-regions of the document image (Action 204). A best match for a sub-region of the document image is determined by finding the sub-region of the selected document image that most closely resembles the sub-region of the document image under a valid transformation. Valid transformations include, but are not limited to, translations of the sub-region of the document image, rotations of the sub-region of the document image, scaling of the sub-region of the document image, and affine transforms of the sub-region of the document image.

A best match for a sub-region of the document image is also associated with a quality score corresponding to the quality of the match. In certain embodiments, the quality of a sub-region of the selected document image is assessed on a scale of zero to one, where zero is no match and one is a perfect match. A perfect match only exists if some sub-region of the selected document image exactly matches the sub-region of the document image under a valid transformation, such as a rotation. Under such embodiments, the quality score may be defined as the number of overlapping black pixels between the sub-region of the document image and the sub-region of the selected document image divided by the average number of black pixels in the sub-region of the document image and the sub-region of the selected document image corresponding thereto. Additionally, in certain embodiments, if a quality score for a best match is below a confidence threshold, the corresponding sub-region of the document image may be ignored for the remainder the method 200.

Figure 3:
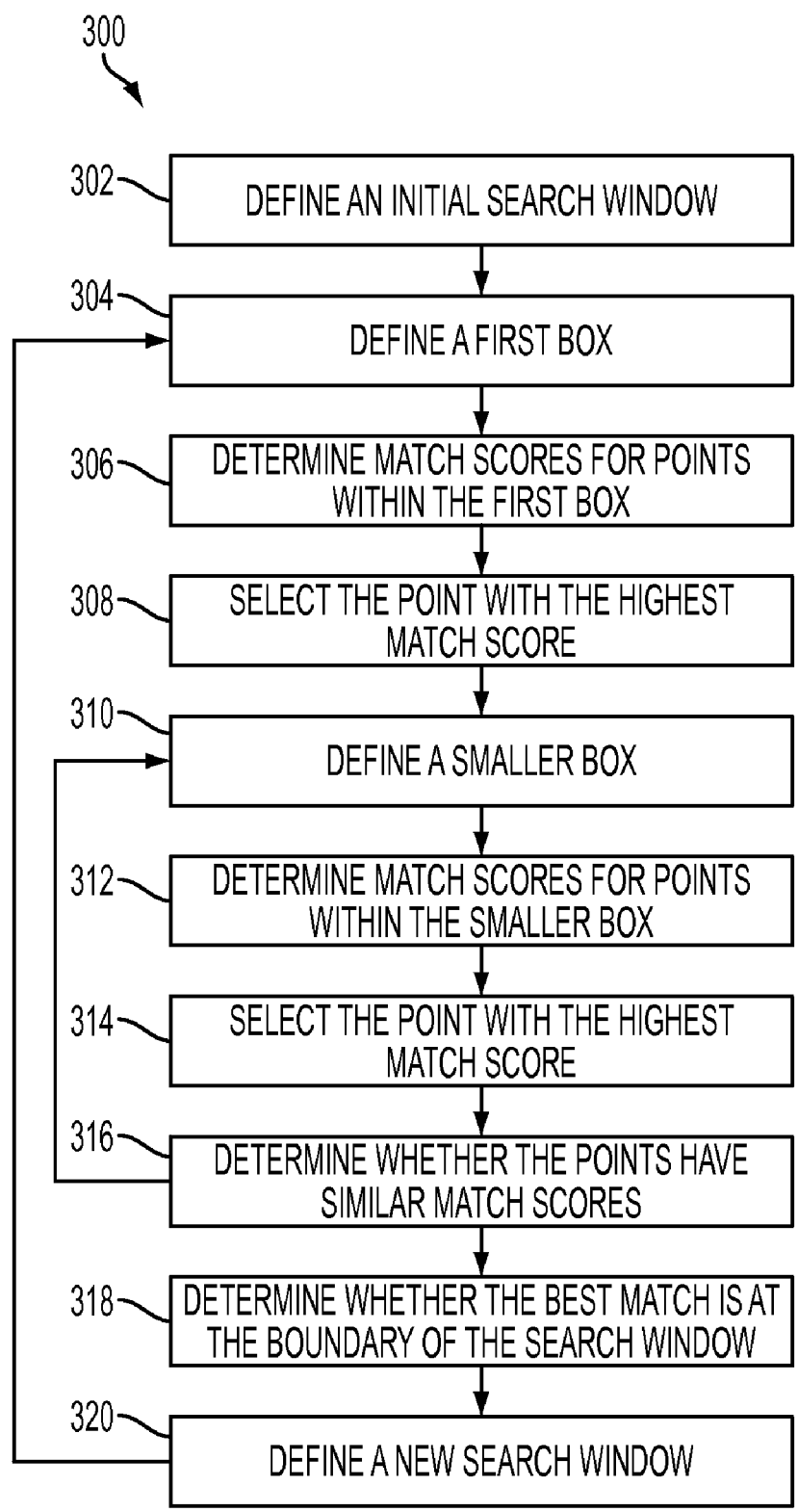
FIG. 3 illustrates a hierarchical search procedure.

To find the best match for a sub-region of the document image, a hierarchical search procedure is preferably, but not necessarily, employed. With reference to FIG. 3, a hierarchical search procedure 300 is illustrated. The hierarchical search procedure begins by defining a search window centered on a sub-region of a document image (e.g., $A_i$). The search window is used to find a sub-region in a selected representative image (e.g., B) that most closely resembles the sub-region of the document image (Action 302). Although more sophisticated methods of determining the approximate location may be employed, in certain embodiments, the location of the sub-region of the document image is simply mapped to the corresponding location within the selected document. For example, consider a sub-region at a location $(x_0, y_0)$ in a document image having a width $w_0$ and a height $h_0$. If the selected document image has a width $w_1$ and a height $h_1$, the corresponding location $(x_1, y_1)$ within the selected document could be defined as follows.

$$x_1 = \frac{w_1}{w_0} * x_0 \quad (1)$$

$$y_1 = \frac{h_1}{h_0} * y_0 \quad (2)$$

After defining the search window (Action 302), a first box smaller than the search window and centered within the search window is defined (Action 304) and match scores for points located within the first box are determined (Action 306). In certain embodiments, match scores are determined for nine points which are the corners, side midpoints and center of the box. A match score for a point is determined by attempting to match the sub-region of the document image to the region of the selected document image proximate the point. The operator may define proximate as they see fit, subject to the understanding that the broader the operator defines proximate, the slower the hierarchical search procedure 300 becomes. The point having the highest match score is then selected (Action 308).

A box smaller than the previous box and centered around the best match from the previous box is thereafter defined (Action 310). Match scores for points located within the smaller box are then determined (Action 312), similar to the first box, and the point having the highest match score is selected (Action 314). After selecting the highest match score, a determination is made as to whether the points of the smaller box have similar match scores (Action 316). For example, the match scores are compared to each other to determine whether they differences between the points fall within a given threshold. If the points of the smaller box are not similar to each other, Actions 310 through 316 are repeated. If the points of the smaller box are similar to each other, a determination is made as to whether the best match is at the boundary of the search window (Action 318). If it is not, the process 300 terminates. Otherwise, the process 300 defines a new search window centered around the best match (Action 320) and repeats Actions 304 through 318.

Figure 4:
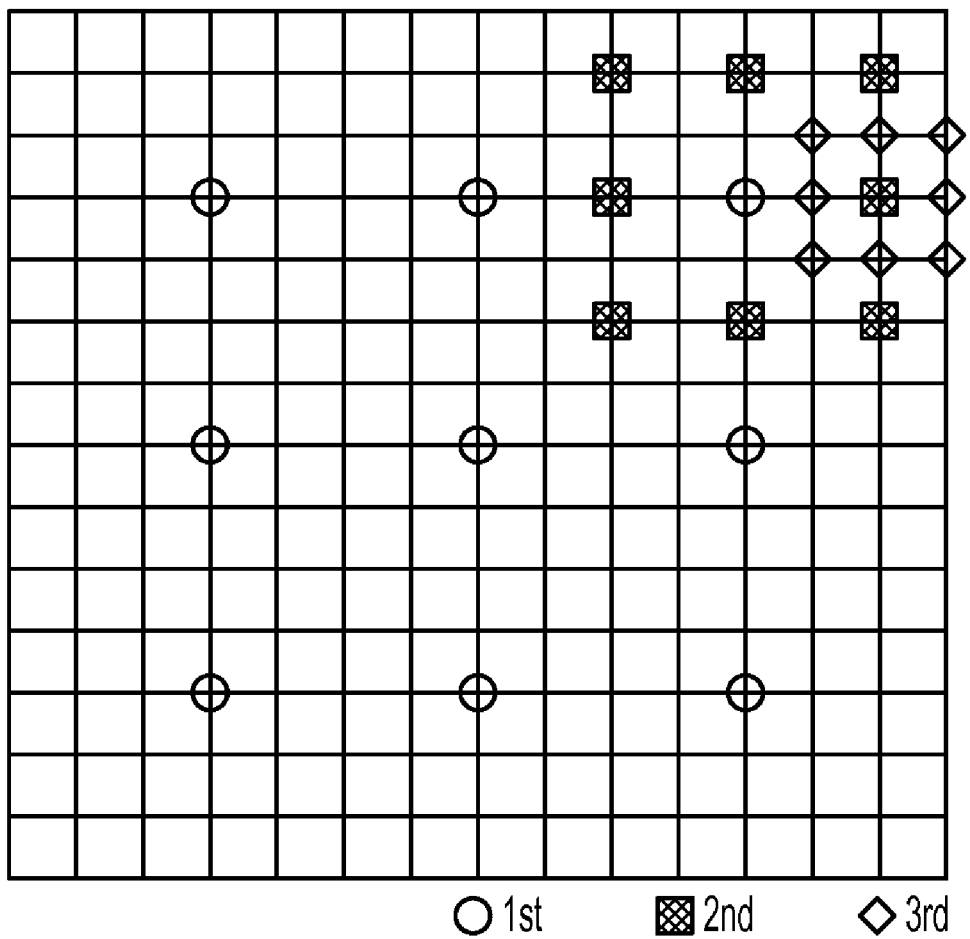
FIG. 4 illustrates a search window of a hierarchical search procedure.

With reference to FIG. 4, a 15×15 block search window is illustrated, where, for purposes of this illustration, a block has the same size as a sub-region. For example, in instances where a sub-region is 128×128 pixels, a block has a size of 128×128 pixel.

Referring back to FIG. 2, once the best matches for the sub-regions of the document image are determined (Action 204), a transformation for the document image is determined (Action 206). This determination is made using a least squares analysis to minimize the difference between the best matches and the sub-regions of the document image. Essentially, the goal is to map the points in the sub-regions of the document image to the points in the corresponding sub-regions of the selected document image. In doing this, the least squares analysis may account for one or more valid transformations, where valid transformations, include, but are not limited to, rotations, translations, scaling, affine transformations, page curl, keystoning, etc. In certain embodiments, the least squares analysis may also include outlier rejection to allow for bad matches.

To illustrate, suppose a sub-region $r_s$ within the selected document image can be modeled as a function $f$ of a sub-region $r_d$ within the document image. Further, suppose the function $f$ takes a vector $\beta$ of variable parameters, which control how the function $f$ models the relationship between the two sub-regions, and the difference between two sub-regions is based upon how well the two support regions match. Parameters may include the amount of rotation, scaling, translation, etc. The sum of the squares of the error S can then be defined as $$S = \sum_{i=1}^{n} d((x_i, y_i), f(x_i, y_i))^2, \quad (3)$$

where n corresponds to the number of sub-regions or initial blocks selected in Action 202, $f(\ )$ is a function that applies a transformation to the point $(x_i, y_i)$ that results in a new point, d is a measure of distance between point $(x_i, y_i)$ and the translation point $f(x_i, y_i)$, i corresponds to the ith initial block within the selected document image B (i.e., the closest match) and $f(x_i, y_i)$ corresponds to the location to the ith initial block within the document image $A_i$.

Having defined the sum of squares S, the transformation for the document image $A_i$ is determined by solving for the variable parameters of the vector β. Namely, suppose the vector β has m parameters and $β_j$ corresponds to the jth parameter. The solution to the jth parameter can be determined by solving the following equation for the parameter $β_j$ using conventional techniques such as linear equations.

As should be appreciated, the variable parameters determined in this way minimize the sum of the squares of the errors involved with mapping the sub-regions of the document image to sub-regions of the selected document. Assuming the transformations matrices tend to be rigidly applied across the entirety of the document image, the variable parameters can be used to globally define a transformation for the document image.

After determining the transformation for the document image (Action 206), the transformation is applied to the document image to define an aligned document image (Action 208). Namely, as noted above, a sub-region n within the selected document image can be modeled as a function $f$ of both a sub-region n within the document image and vector β of variable parameters. While function $f$ was used in the previous Action to determine the variable parameters, it can also be used to transform a document image into a document image aligned with the selected document image by simply passing the vector β and the document image to function $f$.

Figure 5:
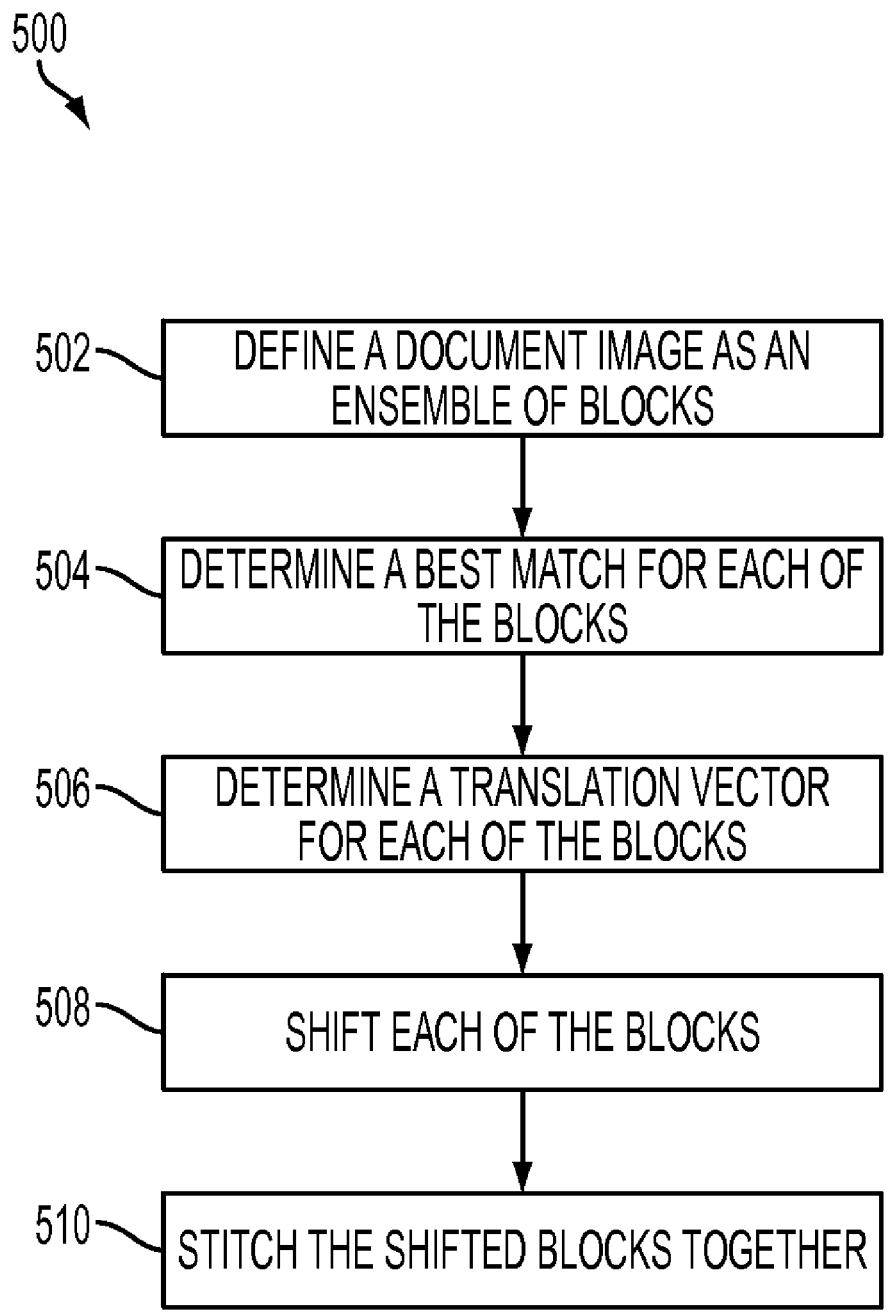
FIG. 5 illustrates a method for locally aligning a document image to a selected document image.

With reference to FIG. 5, a method 500 for locally aligning a document image to the selected document image is illustrated. The method 500 includes defining the document image as an ensemble of blocks (Action 502), determining a best match for each of the blocks (Action 504), determining a translation vector for each of the blocks (Action 506), shifting each of the blocks (Action 508) and stitching the shifted blocks together (Action 510).

To begin, the document image is divided into an ensemble of blocks encompassing the entirety of the document image (Action 502), where each of the blocks includes neighbors. As should be appreciated, a block is simply a sub-region of the document image. In certain embodiments, the blocks are at least one of nonoverlapping, or overlapping by a small amount (e.g., 10 pixels) to prevent gaps between blocks, and uniformly sized. The operator selects the size of blocks after weighing at least the following considerations: 1) the smaller the block size, the more processing time that is needed; and 2) the larger the block size, the less effective the local alignment is. Having weighed these considerations, a typical block size for a 300 DPI document image is 128×128 pixels, i.e., each region block may have an area of at least 1 cm² and an image may be divided into at least 50 or at least 100 region (or secondary) blocks, e.g., up to 5000 regions.

After defining the document image as an ensemble of blocks (Action 502), a best or closest match for each of the blocks is determined (Action 504). A best match for a block is determined by finding the sub-region of the selected document image that most closely resembles the block under a valid transformation. Further, a best match includes a quality score corresponding to the quality of the match. Thus, as should be appreciated, a best match for a block is determined in the same way as a best match for a sub-region of the document image, discussed in connection with FIG. 3, whereby attention is directed to the foregoing discussion.

Having the best matches (Action 504), translation vectors are determined for each of the blocks next (Action 506). A translation vector for a block is simply the amount of translation the block needs to undergo to align with its best match. In certain embodiments, if the quality score for a best match is below a confidence threshold, the translation vector may be extrapolated from the translation vectors of its neighbors. Namely, the translation vector for such a block can be set to the average translation vector of its neighbors.

Figure 6:
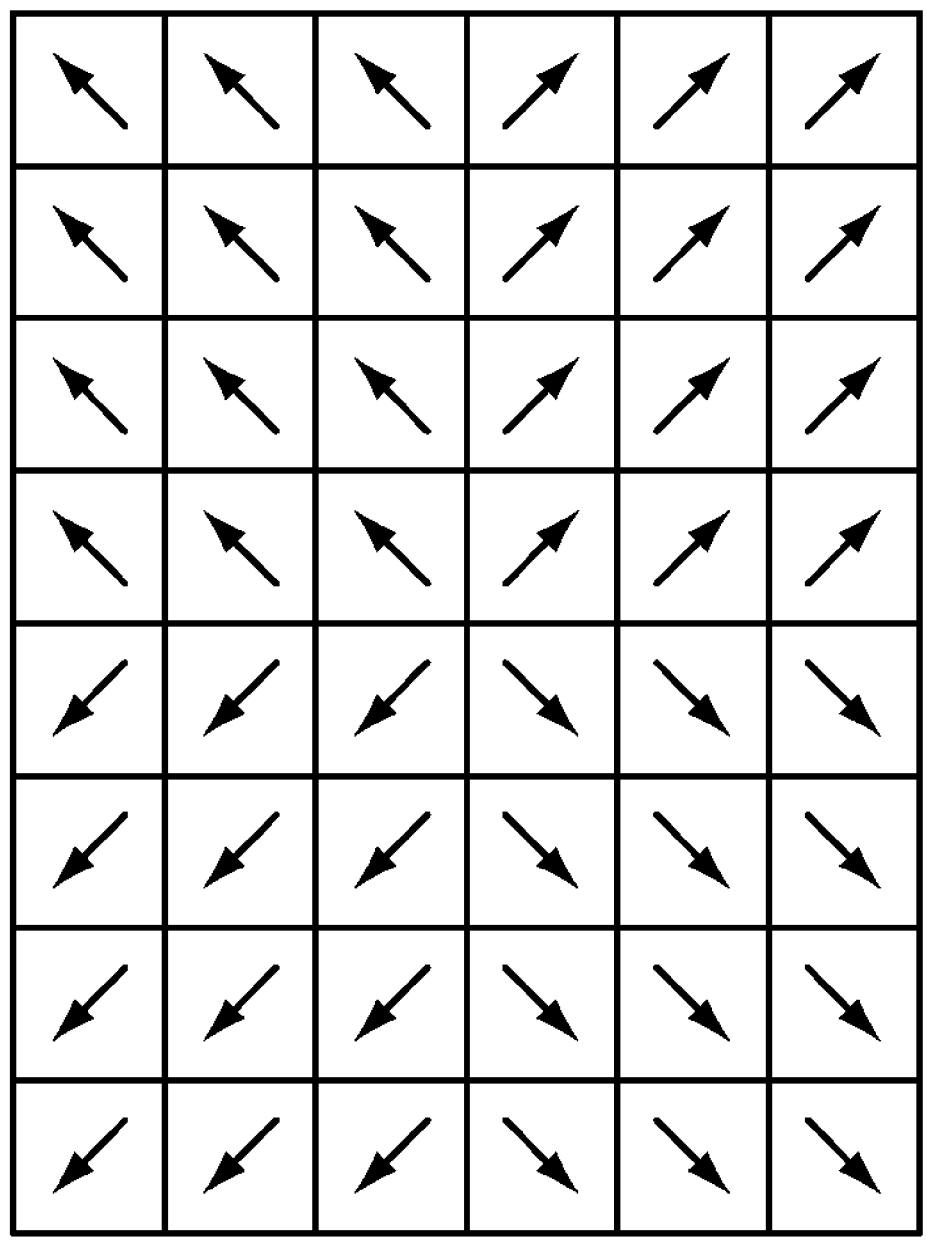
FIG. 6 illustrates a distortion map for a document image.

With reference to FIG. 6, a distortion map for a document image is illustrated. Therein, one will note that the document image is divided into a 6×8 grid of blocks. Further, one will note that each block is associated with a translation vector. Although only translation vectors for a discrete set of blocks were determined, the translation vector for any point in the document image can be determined using bilinear interpolation from the translation vectors at four grid points surrounding the point.

As further shown in FIG. 5, after the translation vectors are determined for each of the blocks (Action 506), the translation vectors for each of the blocks are applied to the individual blocks (Action 508) and all the shifted blocks are stitched together to give an aligned document image (Action 510). In certain embodiments, stitching is performed without interpolation.

Referring back to FIG. 1, after each of the other document images of the first class are aligned to the selected document image (Action 104), the low variance regions between the selected document image and the other document images are determined (Action 106). Conceptually, low variance regions can be determined by overlaying the selected document image and the other document images to determine regions shared by the document images. Thus, low variance regions are simply those regions that vary little between the selected document image and the other document images. In certain embodiments a margin may be imposed on low variance regions, such that a low variance region must be a predefined distance from a region of high variance.

In certain embodiments, low variance regions of binary document images are determined by first summing the aligned document images and the selected document image pixel-wise, where each summation corresponds to a pixel location. In summing the document images, a black pixel at a pixel location in a document image yields a one and a white pixel at the pixel location in a document yields a zero. Once this is complete, the number of black and the number of white pixels are known for each pixel location, since a summation explicitly defines the number of black pixels and the number of white pixels can be determined by subtracting the number of black pixels from the number of document images (i.e., the selected document image and the other document images).

Having the summations for each pixel location, the variance of a pixel location can be determined by dividing the lesser of the number of black pixels and the number of white pixels by the total number of document images and passing the quotient through a threshold. If the quotient exceeds the threshold, the pixel location has high variance. If the quotient is less than the threshold, the pixel location has low variance. Naturally, as should be appreciated, performing this on each pixel location allows the determination of regions of low variance since a region can be fairly characterized as a collection of one or more pixel locations.

Notwithstanding the foregoing method of determining low variance regions, other methods are equally amenable. For example, in other embodiments, methods for determining low variance regions may provide additional weight to the selected document image.

Once the low variance regions are determined (Action 106), the low variance regions are used to generate image anchor templates (Action 108). In certain embodiments, this includes extracting the low variance regions from the document images to define a collection of candidate images. In some of said embodiments, the extraction of candidate images may be limited to the low variance regions as applied to the selected document image. In other embodiments, the locations of the low variance regions may be used during the generation of candidate image anchor templates, thereby removing the need to extract candidate images. Regardless of the embodiment used however, it should be appreciated that the foregoing embodiments are more a matter of form than substance.

The candidate images and/or the locations of the regions of low variance are then passed to an image anchor template generating function. An image anchor template generating function takes at least document images of the first class as input and automatically generates image anchor templates. In certain embodiments, the image anchor template generating function generates image anchor templates directed towards content anchoring and/or data extraction. In other embodiments, the image anchor template generating function generates image anchor templates directed towards the classification of documents.

Figure 7:
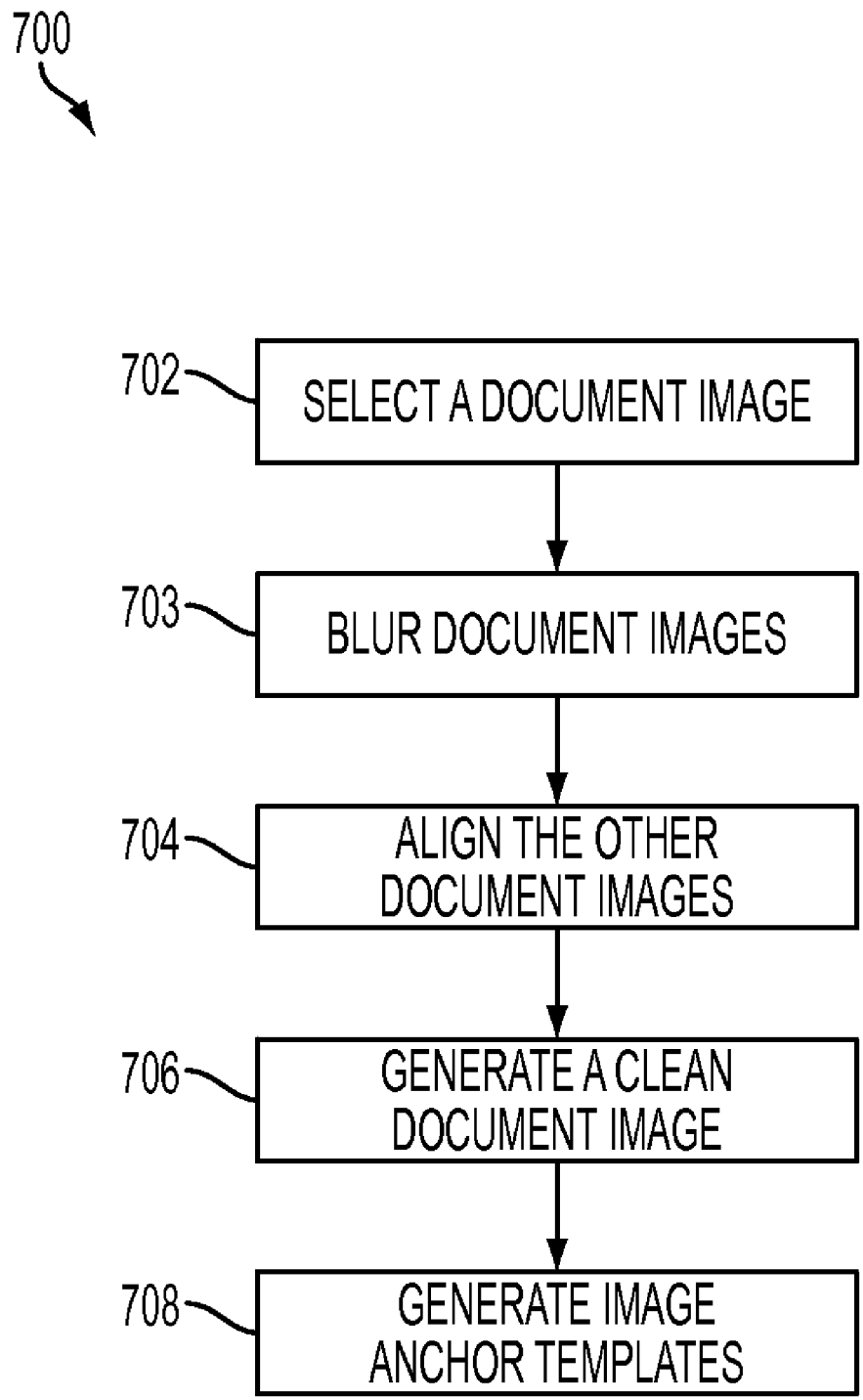
FIG. 7 illustrates a method for generating image anchor templates from low variance regions of document images of a first class.

With reference to FIG. 7, a method 700 for generating image anchor templates from low variance regions of document images of a first class is illustrated. In contrast with the method 100 of FIG. 1, this method 700 uses variance to generate a clean document image, which is used to generate the image anchor templates. The method 700 includes selecting a document image (Action 702), aligning the other document images (704), generating the clean document image by combining the aligned document images and the selected document image (Action 706) and generating image anchor templates (Action 708). Optionally, the method 700 further includes blurring the document images (Action 703).

The method 700 begins by selecting a document image from the document images of the first class (Action 702), optionally blurring the document images (Action 703), and aligning each of the other document images of the first class to the selected document image (Action 704). As should be appreciated, Actions 702, 703, and 704 are substantially the same as Actions 102, 103, and 104 of FIG. 1, respectively, whereby they need not be repeated. Therefore, for more information pertaining to these Actions, attention is directed to FIG. 1 and the accompanying text.

Once the other document images are aligned to the selected document image (Action 704), the clean document image is generated by combining the aligned document images and the selected document image (Action 706). As should be appreciated, there are various ways to do this. However, in certain embodiments, the clean document image is generated by summing all the document images pixel-wise, where each summation corresponds to a pixel location, and passing the summations through a threshold to convert the summations into a black and white image. In other embodiments, the clean document image is generated by voting. Namely, all the document images are summed pixel-wise as described in connection with Action 106 of FIG. 1, where a black pixel in a document image yields a one and a white pixel in a document image yields a zero. Thereafter, a pixel at a pixel location in the clean document image is black if the corresponding summation reports that a predefined number of the document images have black pixels at the pixel location. For example, if at least two-thirds of the document images have a black pixel at a pixel location, the pixel at the pixel location in the clean document image will be black. In some of these embodiments, a black pixel at a pixel location in the selected document image may be necessary for a pixel at the pixel location in the clean document to be black. In certain embodiments, the clean document image may be further cleaned by removing salt-and-pepper noise, isolated white and black pixels and small connected components of pixels to form the clean document image 2.

With the clean document image generated (Action 706), the clean document image is used to generate image anchor templates (Action 708). Namely, the clean document image is passed to an image anchor template generating function. In certain embodiments, large salient structures of the clean document image are labeled, so that image anchor templates can be learned and detected at low resolutions (sub-sampled images). As noted above, an image anchor template generating function takes at least document images of the first class as input and automatically generates image anchor templates. In certain embodiments, the image anchor template generating function generates image anchor templates directed towards content anchoring and/or data extraction. In other embodiments, the image anchor template generating function generates image anchor templates directed towards the classification of documents.

Having introduced the methods for generating image anchor templates from low variance regions of document images of a first class, two image anchor template generating functions will be discussed. Namely, after discussing some basic building blocks pertaining to image anchor templates, image anchor template generating functions directed towards document classification and data extraction will be discussed.

An image anchor template t consists of a template image t·im and a region of interest t·roi. The template image t·im is a sub image $T_a$ of a template source T, $$t\cdot im = T_a,$$

where a denotes the sub-region of the template source T. The sub-region a is specified relative to the coordinates of the template source T and, typically, the sub-region a will be an axes-parallel rectangular region. The region of interest t·roi, in contrast, is specified relative to the coordinates of a target image I. A target image I is an image matched against an image anchor template t.

In certain embodiments, location of the region of interest t·roi is specified relative to the upper left corner of the target image I. In other embodiments, the location of the region of interest t·roi is specified relative to the boundaries of the target image I. Under these embodiments, the region of interest t·roi can be specified using the following equations.

$$x = \alpha w + x_0$$

$$y = \beta h + y_0$$

Therein, the width and height of the target image I are represented by w and h, respectively. Further, both $\alpha$ and $\beta 0$ range from zero to one and represent a normalized position within the target image I. For example, $\alpha=1$ and $\beta=1$ yields the bottom right corner of a target image I. Similarly, $\alpha=0.5$ and $\beta=0.5$ yields the center of a target image I. The offset from the normalized position is represented by $x_0$ and $y_0$.

With reference to FIG. 8, a template source 800 is illustrated. The template source 800, as shown, is an empty form and includes an image anchor template 802. The image anchor template is comprised of a region of interest 804 and a template image 806.

A template matching function m(t,I) takes an image anchor template t and a target image I, and explores a set of valid transformations of the template image t·im to find the closest resemblance of the template image t·im within the target image I. Valid transformations are restricted to the template region of interest t·roi and may include at least one of translations of the template image t·im, rotations of the template image t·im, scaling of the t·im, and affine transforms of the t·im. It should be appreciated, however, that other transformations of the template image t·im are equally amenable.

After locating a good resemblance within the target image I, a template matching function returns a match score m(t,I)·score and, in some embodiments, a match location m(t,I)·x. In certain embodiments, a template matching function may also return the valid transformation corresponding to the best match and/or the best matching sub-region of the target image I.

A match score m(t,I)·score is a score in the range of [0, 1], where zero indicates no match and one indicates a perfect match. A perfect match only exists if some sub-region of the target image I exactly matches pixel for pixel the template image t·im under a valid transformation. Further, if an image anchor template t matches multiple locations, the score is discounted by a factor that increases with the number of matches. Thus, the score returned by a template matching function m(t,I) is typically, but not necessarily, a score that represents the "goodness" of the best match found.

A match location m(t,I)·x is a location in the target image corresponding to the likely location of a data field, to be discussed in connection with data extraction. The determination as to the location of the target data field is made by using the known location of the data field relative to the image anchor template. For example, if a data field is known to be two units (e.g., inches) above the image anchor template, the match location is simply the matching location of the image anchor template corrected for this 2 unit displacement.

While any template matching function, subject to the restraints noted above, may be used, in certain embodiments, template matching functions are based on at least one of basic correlation measures with or without various kinds of normalization, probabilistic likelihoods or likelihood ratios (such as multi-level templates for Document Image Decoding), Hausdorff distance, and comparisons based on local measurement histograms (such as Earth Movers Distance).

When dealing with binary documents, template matching functions based on Hausdorff distance are of particular interest because said template matching functions are known to be fast and efficient when dealing with binary images. The Hausdorff distance between two images (e.g., a template image and a sub-region of a target image) is defined as the maximum distance between two corresponding foreground points after the template has been transformed by the most favorable valid transform to get the best match scenario.

Rucklidge et al. developed an efficient branch and bound based technique for locating templates in larger images by minimizing the Hausdorff distance between a set of template image points and a set of sub-image points. For more information, attention is directed to Daniel P. Huttenlcoher and William J. Rucklidge, A multi-resolution technique for comparing images using the Hausdorff distance, Technical Report TR 92-1321, Cornell University, 1992 and William Rucklidge, Efficient Visual Recognition Using the Hausdorff Distance, Springler-Verlag New York, Inc. Secaucus, N.J., USA, 1996, both of which are incorporated herein by reference.

A template detection function d(t,I) is a Boolean function that returns a one or a zero to indicate if a good match was found, where zero means no match was found. A template detection function may be constructed by comparing the match score of the template matching function to an acceptance threshold q.

$$d(t,I;m,q)=1 \text{ if } m(t,I) > q$$

0 otherwise

A composite image anchor template C is a collection of image anchor templates $(t_1, t_2, \ldots, t_k)$. Similar to the template matching function described above, a composite template matching function m(C,I) generally returns a match score m(C,I)·score and, in some embodiments, a match location m(C,I)·x, where the match score and the match location are substantially as described above. However, in contrast with the template matching function described above, the composite template matching function considers how each of the image anchor templates match a target image I. A typical composite matching function is obtained by defining a function over the individual template matching functions $$m(C,I)=f(m(t_1,I), \ldots, m(t_K,I))$$

In certain embodiments, the composite template matching function returns the match score and, in some embodiments, the match location for the highest scoring image anchor template. In other embodiments, the composite template matching function returns the average of the match scores of the image anchor templates and, in some embodiments, the average of the match locations of the image anchor templates weighted by the respective match scores.

A composite template detection function d(C,I), similar to the template detection function described above, returns zero or one (match or no-match). In certain embodiments, the composite template detection function is a Boolean combination of the individual template detection functions, discussed above. In some of these embodiments, a voting scheme may be employed, wherein a predefined number of the image anchor templates need to indicate a match. For example, two-thirds of the image anchor template may be required to indicate a match before the composite template detection function indicates a match. In other embodiments, a binary document classifier function may be employed as a composite detection function.

A binary or multicategory document classifier function takes a target image and a collection of image anchor templates, which can discriminate between target images of different classes, and returns a classification. A binary document classifier function simply indicates whether a target image is of a certain classification. A multicategory document classifier function returns the classification of a target image from one of a plurality of known classifications. In certain embodiments, a document classifier function builds upon template matching functions and/or template detection functions by treating the results of the template matching functions and/or the template detection functions as input vectors to a classifier.

For example, if one has an image anchor template known to only match documents of a first class (and not documents of other classes), one can easily construct a document classifier function based upon whether the image anchor template matches a document image. In a more complex case, it may take combinations of image anchor templates to discriminate between documents of different classes. In such cases, a document classifier function simply needs to be able to recognize these combinations from a vector of results from template matching functions and/or template detection functions. Boolean algebra presents a useful tool for dealing with a vector of detection results.

Figure 9:
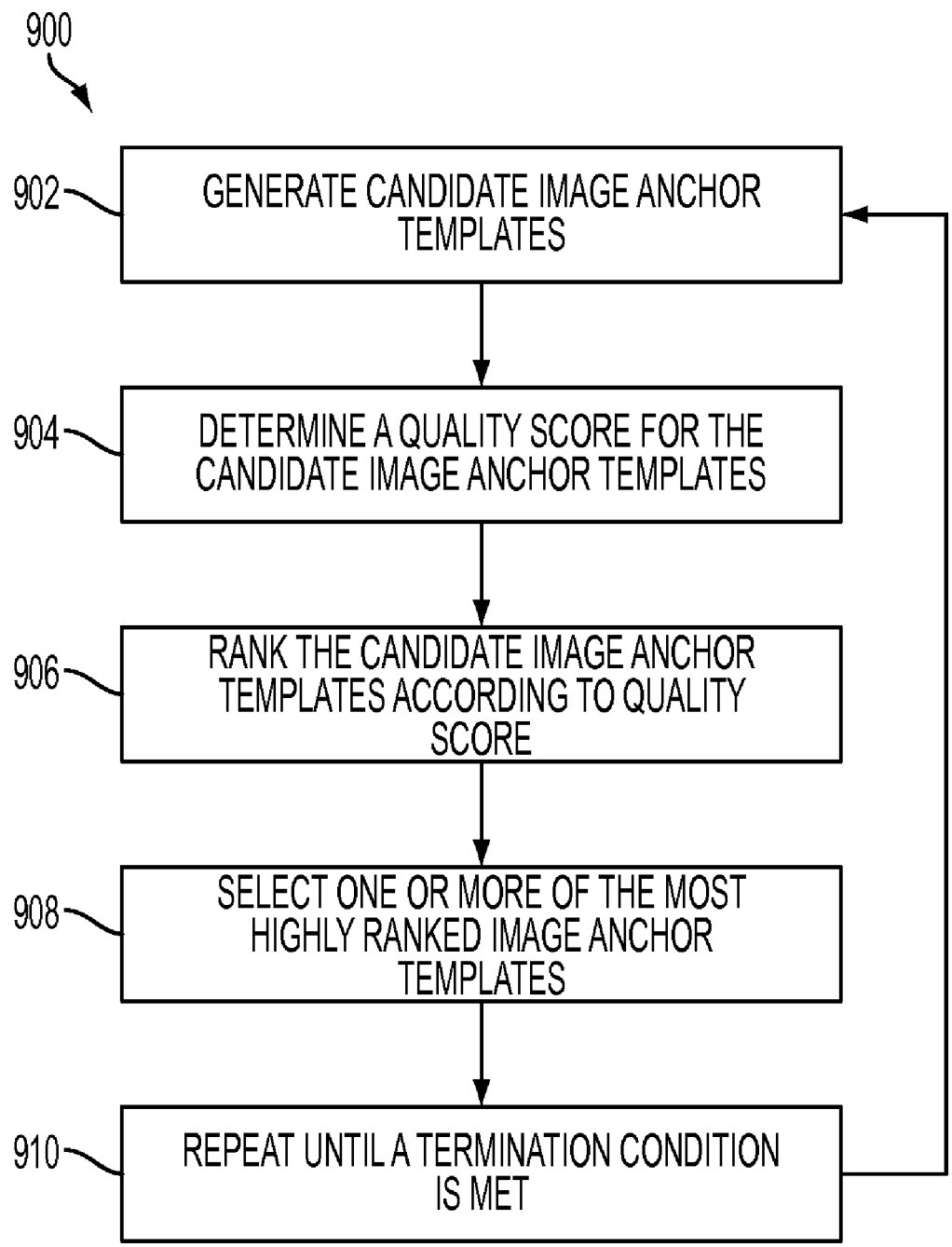
FIG. 9 illustrates an image anchor template generating function for discriminating between document images of a first class and document images of other classes.

With reference to FIG. 9, an image anchor template generating function 900 for generating one or more image anchor templates for discriminating between document images of a first class and document images of other classes is illustrated. The function 900 includes generating candidate image anchor templates (Action 902), determining a quality score for each of the candidate image anchor templates (Action 904), ranking the candidate image anchor templates according to quality score (Action 906), and selecting one or more of the most highly ranked image anchor templates (Action 908). In certain embodiments, the function 900 further includes repeating Actions 902 through 908 until a termination condition is met (Action 910).

To begin, candidate image anchor templates are generated using a candidate image anchor template generator (Action 902). A candidate image anchor template generator takes an image or an image anchor template and, in some embodiments, at least one of exemplar document images of the first class, exemplar document of the other classes, and a search restraint as input. Search restraints limit the regions of the input image searched for candidate image anchor templates. In certain embodiments, the input image is at least one of an exemplar document image of the first class, the clean document image of the method 700 of FIG. 7, and a candidate image from the method 100 of FIG. 1. In certain embodiments, locations of low variance regions of the document images of the first class, determined in the method 100 of FIG. 1, are provided as a search restraint. Based upon this input, the candidate image anchor template generator generates candidate image anchor templates.

In certain embodiments, generating candidate image anchor templates entails extracting sub-regions from the input image and/or performing any number of valid transformations on the input image or the input image anchor template. Valid transformations include, but are not limited to, translations, rotations, affine transformations, etc. Examples of candidate image anchor template generators include, but are not limited to, a coarse grid sampling generator, a seeded collection generator, and a transitive explorer generator.

The coarse grid sampling generator takes an image and, in certain embodiments, a search restraint as input. Thereafter, it generates a coarse sampling of image anchor templates from the input image, subject to the search restraint. In other words, the coarse grid sampling generator divides the input image into sub-regions and extracts the sub-regions into image anchor templates. In certain embodiments, image anchor templates whose pixels are almost all white or almost all black are discarded because they're intrinsically understood to have low discriminative power. To control the number of candidate image anchor templates generated by the coarse grid sampling generator, the size of image anchor templates to be extracted from the input image can be varied. Naturally, the smaller the size, the more image anchor templates.

The seeded collection generator (also called a perturbation generator) takes an image anchor template as input and generates new image anchor templates by performing valid transformations on the input image anchor template. Valid transformations include, but are not limited to, translations, rotations, affine transformations, etc. Thus, the seeded collection generator generates image anchor templates by exploring variations of the input image anchor template. In certain embodiments, the seeded collection generator may also explore variations of the region of interest of the input image anchor template.

The transitive explorer generator is a special kind of seeded collection generator that takes an image anchor template and exemplar document images as input and matches the image anchor template against the exemplar document images, where new image anchor templates are constructed by carving out the matches within the exemplar document images. In certain embodiments, the transitive explorer generator also explores valid transformations on the input image anchor template, similar to the seeded collection generator. Additionally, in certain embodiments, the transitive explorer generator generates an image anchor template by combining all the matches within the exemplar document images. In some of these embodiments, this is determined by identifying the most consistent pixels when all the matching locations are overlaid on one another.

Notwithstanding the enumerated image anchor template generators, other kinds of image anchor template generators are equally amenable. Additionally, image anchor template generators can be nested in various configurations to obtain new composite generators. For example, typically the seeded collection generator and/or the transitive explorer generator are used with the coarse grid sampling generator, where image anchor templates generated by the coarse grid sampling generator are used as input to the seeded collection generator and/or the transitive explorer generator.

After candidate image anchor templates are generated (Action 902), a quality score is determined for each of the candidate image anchor templates using a template scoring function (Action 904). The quality score of an image anchor template is a measure of its discriminative power, which corresponds to the ability the image anchor template to discriminate between document images of the first class and document images of the other classes.

To facilitate the determination of a quality score, a template scoring function generally takes as input an image anchor template and one or more exemplar document images of the first class (i.e., positive exemplars). In certain embodiments, a template scoring function may also take one or more exemplar document images of the other classes (i.e., negative exemplars) as input. Exemplar document images allow the subject method to empirically determine the ability of image anchor templates to discriminate between documents of the first class and documents of the other classes.

Using the exemplar document images as input, a template scoring function may, but need not, determine a quality score for an image anchor template using intrinsic image anchor template characteristics and/or image anchor template response. Image anchor template response includes, but is not limited to, empirical supervised estimates of quality, empirical unsupervised estimates of quality, and empirical one-sided estimates of quality.

A template scoring function using intrinsic template characteristics takes at least an image anchor template as input. It then looks for characteristics of the image anchor template that correspond to approximately known discriminative power. For example, all white or all black image anchor templates aren't likely to be useful, whereby said image anchor templates may be fairly assigned low quality scores. Naturally, the level of resolution of such a template scoring function is limited. However, it provides a quick way to efficiently discard image anchor templates.

A template scoring function using empirical supervised estimates of quality takes at least an image anchor template, positive exemplar document images, and negative exemplar document images as input. It then looks to an image anchor template response on the exemplar document images. Namely, for an image anchor template t and a matching function m(t,I), the matching scores for all the exemplar document images (positive and negative) are generated and used to generate a receiver operating characteristic (ROC) curve by varying the acceptance threshold q in a template detection function d(t,I).

Figure 10:
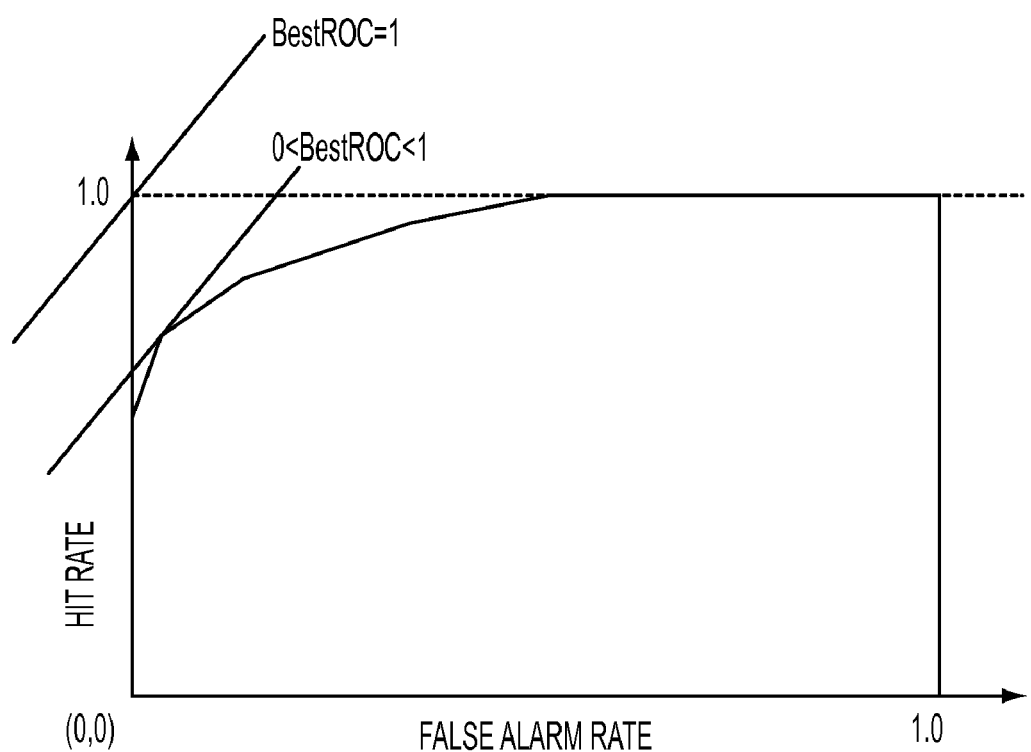
FIG. 10 illustrates an ROC Curve.

An ROC curve is obtained by plotting a hit rate (i.e., the rate of true positives) against a false alarm rate (i.e., the rate of false positives) as the acceptance threshold q is varied. The hit rate for a given acceptance threshold q is simply the rate with which the template detection function d(t,I) correctly classifies an exemplar document image. Since sets of positive and negative exemplar document images are known, verification of the template detection function d(t,I) is easily obtained. In a similar manner, the false alarm rate is readily obtained. With reference to FIG. 10, an ROC curve is illustrated.

After generating the ROC curve, a quality score s for an image anchor template can then be calculated as follows.

$$s(t;m,\alpha) = \text{bestROC}(t;m,\alpha) + \text{AreaROC}(t;m) + \text{margin}(t;m)$$

The areaROC(t,m,α) is simply the area under the ROC curve (i.e., the shaded region of FIG. 10) and margin(t,m) is the difference between the smallest matching score for a positive exemplar document and the largest matching score for a negative exemplar document. Further, the bestROC(t,m,α) is defined as $$\text{bestROC}(t, m, \alpha) = \max_q (\text{hitRate}(q) - \alpha \cdot \text{falseAlarmRate}(q)),$$

where the hitRate(q) and the falseAlarmRate(q) are substantially as described above and α is a penalty for false alarms. The higher α is, the greater the penalty for false alarms.

A template scoring function using empirical unsupervised estimates of quality takes at least an image anchor template and . . . as input. It then looks to an image anchor template response on a sample collection of exemplars. This quality estimate is targeted to situations where there are multiple target categories and the category labels for a collection of exemplars are known, but a determination has not been made as to how to split up the categories. In such a case, a template's quality score is the mutual information between the matching/detection result and the image category label.

A template scoring function using empirical one-sided estimates of quality takes at least an image anchor template and positive exemplar document images as input. It then looks to an image anchor template response on a sample collection of only the positive exemplar document images. Namely, the one-sided metric o(t,m) can be defined as $$o(t, m) = \sum_{I \in positive\ exemplars} \text{prob}(\text{positive category} | m(t, I)),$$

where each probability on the right-hand side can be computed using Bayes' rule with equal priors starting from the following formula.

$$\text{prob}(m(t,I) | \text{positive category}) \propto e^{-\lambda_{pos} \cdot m(t,I)}$$

$$\text{prob}(m(t,I) | \text{negative category}) \propto e^{-\lambda_{neg}(1 - m(t,I))}$$

As should be appreciated, the parameters λ can be trained. However, due to space considerations, in certain embodiments $\lambda_{pos}$ and $\lambda_{neg}$ are set to one, thereby giving the negative category a flatter distribution.

Notwithstanding the enumerated template scoring functions, it should be appreciated that other template scoring functions are equally amenable. For example, composite template scoring functions building on the template scoring functions enumerated above and/or other template scoring functions may be used. Additionally, while the template scoring functions discussed above were defined for single image anchor templates, it should be appreciated that the template scoring functions may be used for composite templates.

Once quality scores for the candidate image anchor templates are generated (Action 904), the candidate image anchor templates are ranked according to the quality scores (Action 906) and one or more of the most highly ranked candidate image anchor templates are selected (Action 908). In certain embodiments, the operator manually defines the number of image anchor templates to be selected. In other embodiments, the number of image anchor templates to be selected is dynamically set to the level that achieves full coverage of all the exemplar document images of the first class (i.e., the positive exemplars). Full coverage refers to the ability to discriminate between all the exemplar document images of the first class and the exemplar document images of other classes.

In certain embodiments, the function 900 is complete at this point. In such embodiments, the selected image anchor templates are the best image anchor templates found for discriminating between document images of the first class and document images of other classes. In other embodiments, however, the function 900 may continue on. Namely, as noted above, after the most highly ranked candidate image anchor templates are selected the function 900 may optionally repeat, subject to the conditions noted below, Actions 902 through 908 until a termination condition is met (Action 910). Under these embodiments, iterations may vary from iteration to iteration. For example, the image anchor template functions and/or the template scoring functions may vary.

With respect to the termination condition, in certain embodiments, the termination condition is an elapsed run time and/or run a predefined number of iterations. For example, the function 900 may run for five seconds before terminating. In other embodiments, the termination condition is whether the selected image anchor templates cover all the exemplar document images of the first class. In other words, whether the selected image anchor templates are able to discriminate between all the exemplar document images of the first class and the exemplar document images of other classes.

Under the latter termination condition, if there are exemplar document images of the first class which are not covered by the selected image anchor templates, those exemplar document images may be used for generating image anchor templates in the next iteration. For example, the exemplar document images which are not covered may be used as input into the coarse grid sampling generator. Alternatively, or in addition, image anchor templates derived from the exemplar document images of the first class not covered may be used as input to the seeded collection generator and/or the transitive explorer generator, whereby these image anchor templates act as seed image anchor templates.

Notwithstanding the exemplary termination conditions noted above, it should be appreciated that other termination conditions are equally amenable and a termination condition may be a composite of individual termination conditions. For example, a termination condition may use both elapsed time and whether the selected image anchor templates are able to discriminate between all the exemplar document images of the first class and the exemplar document images of other classes.

With respect to repeating, Actions 902 through 908 are repeated substantially as described above. One notable exception to this, however, is that new candidate image anchor templates are ranked with the image anchor templates previously selected. In other words, the best image anchor templates from the previous iteration are ranked together with the newly generated candidate image anchor templates from the current iteration. Additionally, one or more of the most highly ranked candidate image anchor templates from the previous iteration may be used as input for the generation of new candidate image anchor templates at Action 902.

Regardless of whether an iterative variant of the function 900 is used, once the function 900 is complete, one can easily use the image anchor templates generated using the function 900 to construct a binary or multicategory document classifier function for classifying document images of the first class, as described above. Namely, once the function 900 has run, one will have a collection of image anchor templates sufficient to discriminate between documents of the first class and documents of the other classes. Thus, determining whether a document falls within the first class is a simple matter of determining whether the document sufficiently matches the determined image anchor templates.

Having discussed the function 900, it is to be appreciated that in certain embodiments the function 900 may be used with composite image anchor templates. Additionally, operator input may be used at any of the Actions noted above. For example, when performing an iterative variant of the function 900, the operator may provide input to control how candidate image anchor templates are generated for each iteration.

It is also to be appreciated that using low variance regions to generate image anchor templates improves performance of the image anchor template generating function. Namely, the function would typically have to consider a large number of candidate image anchor templates in order to generate image anchor templates appropriate for discriminating between documents. However, by limiting the search region for image anchor templates to just those regions of low variance, the amount of time needed to generate image anchor templates is reduced. The rationale behind this is that low variance regions tend to correspond to regions that don't vary between document images of a class, whereby they're intrinsically understood as having a higher likelihood of providing good anchor points.

Figure 11:
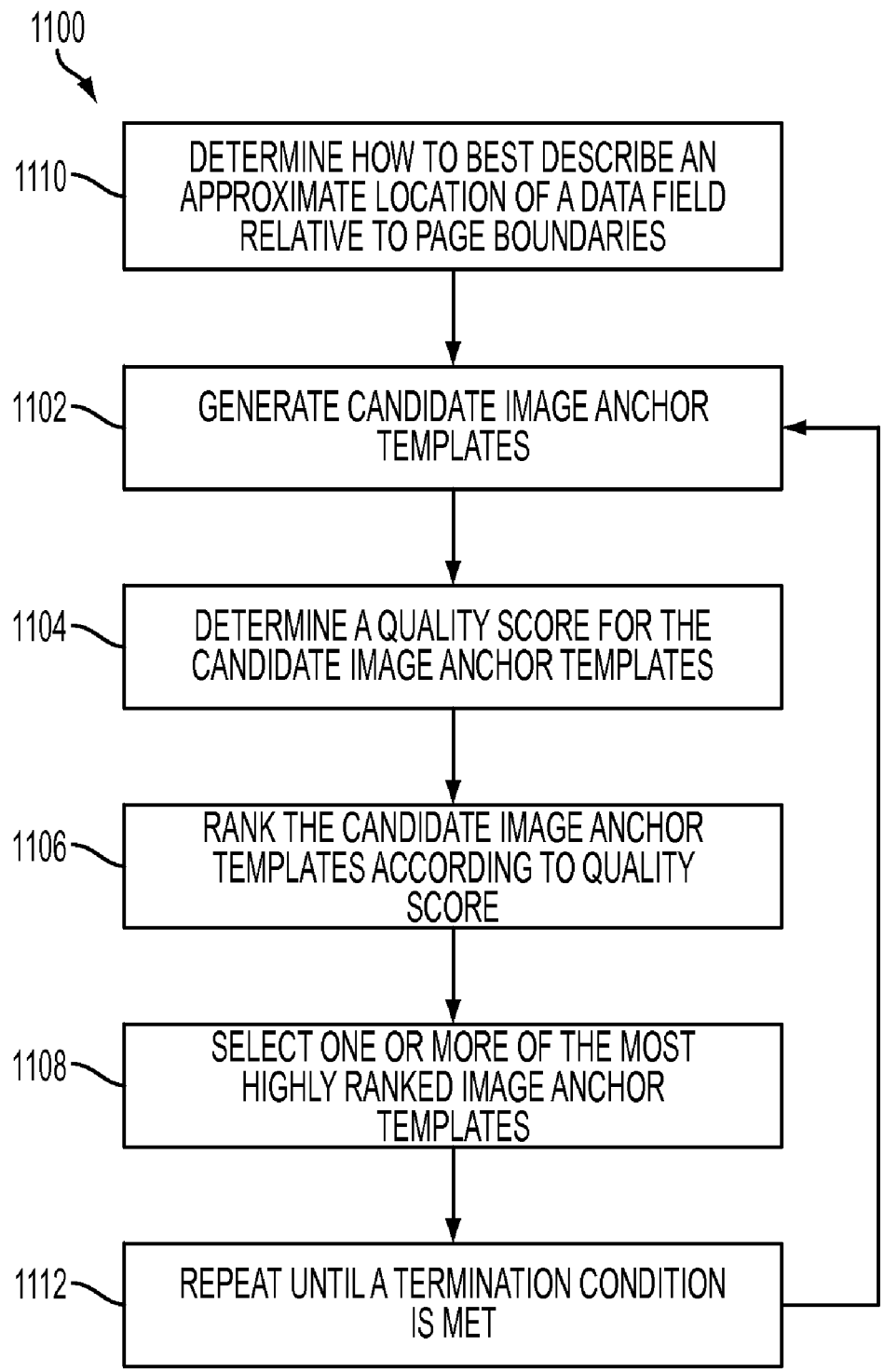
FIG. 11 illustrates an image anchor template generating function for generating one or more image anchor templates for extracting data from a data field of a first class of document images.

With reference to FIG. 11, an image anchor template generating function 1100 for generating one or more image anchor templates for extracting data from a data field of a first class of document images is illustrated. The function 1100 includes generating candidate image anchor templates (Action 1102), determining a quality score for each of the candidate image anchor templates (Action 1104), ranking the candidate image anchor templates according to quality score (Action 1106), and selecting one or more of the most highly ranked image anchor templates (Action 1108). In certain embodiments, the function 1100 further includes determining how to best describe an approximate location of the data field relative to page boundaries of one or more exemplar document images using least squares regression (Action 1110) and/or repeating Actions 302 through 308 until a termination condition is met (Action 1112).

The function may optionally begin by determining how to best describe an approximate location of the data field relative to page boundaries of the one or more exemplar document images of the first class using least squares regression (Action 1110). In choosing how to best describe an approximate location of the data field, the coordinate frame that leads to the lowest (squared) spatial error is chosen. As will be seen, this allows the narrowing of the search space for image anchor templates and the determination of the size of the region of interest for the image anchor templates generated in subsequent steps.

To determine how to best describe an approximate location of a data field relative to page boundaries, the best solution for the following equations is determined using a least squares analysis.

$$x_{u_k} = \alpha w_k + x_0$$

$$y_{u_k} = \alpha h_k + y_0$$

Herein, $x_{u_k}$ and $y_{u_k}$ correspond to the known location of the data field within the kth exemplar document image. Further, $w_k$ and $h_k$ correspond to the known page width and height for the kth exemplar document image.

Solving for the parameters $\alpha, \beta, x_0, y_0$ using a least squares analysis, the parameters $\alpha, \alpha, x_0, y_0$ can be estimated as follows.

$$\alpha = \frac{n \sum_{k=1}^{n} x_{u_k} w_k - \sum_{k=1}^{n} x_{u_k} \sum_{k=1}^{n} w_k}{n \sum_{k=1}^{n} w_k^2 - \left(\sum_{k=1}^{n} w_k\right)^2}$$

$$x_0 = \frac{\sum_{k=1}^{n} x_{u_k} \sum_{k=1}^{n} w_k^2 - \sum_{k=1}^{n} w_k \sum_{k=1}^{n} x_{u_k} w_k}{n \sum_{k=1}^{n} w_k - \left(\sum_{k=1}^{n} w_k\right)^2}$$

$$\beta = \frac{n \sum_{k=1}^{n} y_{u_k} h_k - \sum_{k=1}^{n} y_{u_k} \sum_{k=1}^{n} h_k}{n \sum_{k=1}^{n} h_k^2 - \left(\sum_{k=1}^{n} h_k\right)^2}$$

$$y_0 = \frac{\sum_{k=1}^{n} y_{u_k} \sum_{k=1}^{n} h_k^2 - \sum_{k=1}^{n} h_k \sum_{k=1}^{n} y_{u_k} h_k}{n \sum_{k=1}^{n} h_k - \left(\sum_{k=1}^{n} h_k\right)^2}$$

Herein, n corresponds to the number of exemplar document images having the data field labeled. Further, n, $x_{u_k}, y_{u_k}, w_k, h_k$ are all known, whereby determining $\alpha, \alpha, x_0, y_0$ is a simple matter of "plugging in the numbers."

Once $\alpha, \beta, x_0, y_0$ are determined, the coordinate frame that leads to the lowest (squared) spatial error is known, whereby the approximate location of the data field is known in each of the exemplar document images based upon page boundaries. Advantageously, this allows a narrowing of the search space for image anchor templates to regions of the exemplar document images proximate the approximate location. The size and displacement of these regions proximate the approximate location is given by the neighborhood extent. In certain embodiments the neighborhood extent is simply the region centered around the approximate location and extending a predefined number of pixels in all directions. Additionally, in certain embodiments, these regions proximate the approximate location are extracted from the exemplar document images to define a collection of candidate images, which are used to generate image anchor templates. In other embodiments, the locations of these regions may simply be used during the generation of candidate image anchor templates, thereby removing the need to extract candidate images. Regardless of the embodiment used, however, it should be appreciated that the foregoing embodiments are more a matter of form than substance.

Building on the foregoing, since the approximate location of the data field is known relative to page boundaries of the exemplar document images, it follows that the approximate location of the data field in other document images belonging to the same class as the exemplar document images is roughly known. Consequently, the approximate location can be used to limit the regions of interest for the image anchor template generated by the function 1100. In certain embodiments, the width and height of the region of interest is set to a fixed multiple of the standard deviation of the x and y errors, respectively, from the least squares analysis discussed above.

Regardless of whether the approximate location of the data field was determined (Action 1110), candidate image anchor templates are generated using a candidate image anchor template generator next (Action 1102). A candidate image anchor template generator takes an image or an image anchor template and, in some embodiments, at least one of exemplar document images of the first class, exemplar document of the other classes, and a search restraint as input. Search restraints limit the regions of the input image searched for candidate image anchor templates. In certain embodiments, the input image is at least one of an exemplar document image of the first class, the clean document image of the method 700 of FIG. 7, a candidate image from the method 100 of FIG. 1, a candidate image from Action 1110, and a candidate image determined by combining the candidate images from the method 100 of FIG. 1 and the candidate images from Action 1110. In certain embodiments, locations of low variance regions of the document images of the first class, determined in the method 100 of FIG. 1, and/or regions proximate the approximate location of the data field, determined in Action 1110, are provided as a search restraint.

Based upon this input, the candidate image anchor template generator generates candidate image anchor templates. In certain embodiments, generating candidate image anchor templates entails extracting sub-regions from the input image and/or performing any number of valid transformations on the input image or the input image anchor template. Valid transformations include, but are not limited to, translations, rotations, affine transformations, etc. Under embodiments where the approximate location of the data field is determined (Action 1110), the regions from which candidate image anchor templates can be extracted may be limited to those regions. Examples of candidate image anchor template generator include, but are not limited to, a coarse grid sampling generator, a seeded collection generator, and a transitive explorer generator. As should be appreciated, these image anchor template generators are the same as those discussed above in connection with the function 900 of FIG. 9 for determining image anchor templates for discriminating between documents of a first class and documents of other classes.

After candidate image anchor templates are generated (Action 1102), a quality score is determined for each of the candidate image anchor templates using a template scoring function (Action 1104). The quality score of an image anchor template is a measure of its consistency, discriminability, and anchoring. Consistency refers to the ability of an image anchor template to consistently return high scores when the data field exists. Discriminability refers to the ability of an image anchor template to consistently return low scores when the data field does not exist. Anchoring refers to the ability of an image anchor template to predict the location of the data field with high confidence. As should be appreciated, anchoring requires an image anchoring template to be intrinsically localizable (i.e., non-repeating).

To facilitate the determination of a quality score, a template scoring function generally takes as input an image anchor template and one or more exemplar document images of the first class (i.e., positive exemplars), where the exemplars have the data field labeled. An operator of the function 1100 may for example, label the data field manually within each of the examples. In certain embodiments, a template scoring function may also take one or more exemplar document images of the other classes (i.e., negative exemplars) as input. Exemplar document images allow the subject method to empirically determine the suitability of image anchor templates for localization.

Using the exemplar document images as input, a template scoring function may, but need not, determine a quality score for an image anchor template using intrinsic image anchor template characteristics and/or image anchor template response. Image anchor template response includes, but is not limited to, empirical supervised estimates of quality, empirical unsupervised estimates of quality, empirical one-sided estimates of quality, and empirical one-sided estimates of template anchoring quality. As will become apparent, because the quality score of an image anchor template is a measure of its consistency, discriminability, and anchoring, in certain embodiments a template scoring function using empirical one-sided estimates of template anchoring quality is used with a template scoring function using empirical supervised estimates of quality and/or empirical unsupervised estimate of quality.

A template scoring function using intrinsic template characteristics takes at least an image anchor template as input. It then looks for characteristics of templates that correlate with approximately known localization power. For example, all white or all black regions of a template source aren't likely to yield useful image anchor templates, whereby said image anchor templates may reasonably be assigned low quality scores. Other examples include, but are not limited to, continuous dark or white patches, half-tone patterns, and segments of straight lines, which are intrinsically understood as being unlikely to act as good anchors, and corners and most character shapes, which are intrinsically understood as being likely to act as good anchors. Naturally, the level of resolution of such a template scoring function is limited. However, it provides a quick way to efficiently discard image anchor templates.

A template scoring function using empirical supervised estimates of quality, empirical unsupervised estimates of quality, and/or empirical one-sided estimates of quality is substantially as described above in connection with the determination of image anchor templates for discriminating between documents of a first class and documents of other classes. Further, as should be appreciated, these estimates of quality return a measure of the discrimination power of an image anchor template. Consequently, they will generally be used with a template scoring function using empirical one-sided estimates of template anchoring quality, discussed below.

A template scoring function using empirical one-sided estimates of template anchoring quality takes at least an image anchor template and positive exemplar document images as input. It then looks to an image anchor template response on a sample collection of only the positive exemplar document images. Namely, the metric combines repeatability and anchoring capability into a single numeric score based on which candidate image anchor templates can be ranked or pruned.

Let k be the index variable that represents different exemplar document images having the location of the data field labeled thereon, where $u_k(I_k)$ is the known location in the kth example document image. Further, for an image anchor template t, let $x_k$ denote the predicted location and let $s_k$ be the corresponding confidence score.

$$s_k = A(t, I_k) \cdot \text{score}$$

$$x_k = A(t, I_k) \cdot x$$

Assuming that $(x_k, s_k)$ is sorted in decreasing order of s (most confident predictions first), the one-sided estimate of template anchoring quality can be defined as follows.

$$oa(t, A) = \sum_k s_k \times e^{-\sum_{j<=k}(x_k - u_k)^2 / k}$$

Although a number of template scoring functions were described above, it should be appreciated that other template score functions are equally amenable. For example, composite template scoring functions building on the templates scoring function enumerated above and/or other templates scoring functions may be used. Additionally, while the template scoring functions discussed above were defined for single image anchor templates, it should be appreciated the template scoring functions may be used for composite templates.

Once quality scores for the candidate image anchor templates are generated (Action 1104), the candidate image anchor templates are ranked according to the quality scores (Action 1106) and one or more of the most highly ranked candidate image anchor templates are selected (Action 1108). In certain embodiments, the operator manually defines the number of image anchor templates to be selected.

Having selected the candidate image anchor templates (Action 1108), in certain embodiments, the function 1100 is complete at this point. In such embodiments, the selected image anchor templates are the best image anchor templates found for data extraction. In other embodiments, however, the function 1100 may continue on. Namely, as noted above, after the image anchor templates are selected the function 1100 may optionally repeat, subject to the conditions noted below, Actions 1102 through 1108 until a termination condition is met (Action 1112). Under these embodiments, iterations may vary from iteration to iteration. For example, the image anchor template functions and/or the template scoring functions may vary.

With respect to the termination condition, in certain embodiments, the termination condition is an elapsed run time and/or run a predefined number of iterations. For example, the function 1100 may run for five seconds before terminating. In other embodiments, the termination condition is whether the selected image anchor templates cover all the exemplar document images of the first class. In other words, whether the selected image anchor templates are able to correctly determine the location of the data field in all the exemplar document images of the first class.

Under the latter termination condition, if there are exemplar document images of the first class which are not covered by the selected image anchor templates, those exemplar document images may be used for generating image anchor templates in the next iteration. For example, the exemplars which are not covered may be used as input into the coarse grid sampling generator. Alternatively, or in addition, image anchor templates derived from the exemplars not covered may be used as input to the seeded collection generator and/or the transitive explorer generator, whereby these image anchor templates act as seed image anchor templates.

Notwithstanding the exemplary termination conditions noted above, it should be appreciated that other termination conditions are equally amenable and a termination condition may be a composite of individual termination conditions. For example, a termination condition may use both elapsed time and whether the selected image anchor templates are able to correctly determine the location of the data field in all the exemplar document images of the first class.

With respect to repeating, Actions 1102 through 1108 are repeated substantially as described above. One notable exception to this, however, is that new candidate image anchor templates are ranked with the image anchor templates previously selected. In other words, the best image anchor templates from the previous iteration are ranked together with the newly generated candidate image anchor templates from the current iteration. Additionally, one or more of the most highly ranked candidate image anchor templates from the previous iteration may be used as input for the generation of new candidate image anchor templates at Action 1102.

Regardless of whether an iterative variant of the function 1100 is used, once the function 1100 is complete, one can easily use the image anchor templates to extract data from documents by matching the image anchor templates to the documents and determining the location of the data field. Namely, to extract data from a data field of a document, the image anchor templates are all applied to the document and, if the predictions of the location of the data field are all very similar, the data field is found and the data is extracted. Other uses beyond data extraction include, but are not limited to, altering documents, producing new documents, triggering some processing, or even simply categorizing documents.

Having discussed the function 1100, it is to be appreciated that in certain embodiments the function 1100 may be used with composite image anchor templates. Additionally, operator input may be used at any of the Actions noted above. For example, when performing an iterative variant of the function 1100, the operator may provide input to control how candidate image anchor templates are generated for each iteration.

It is also to be appreciated that using low variance regions to generate image anchor templates improves performance of the image anchor template generating function. Namely, the function would typically have to consider a large number of candidate image anchor templates in order to generate image anchor templates appropriate for localizing a data field. However, by limiting the search region for image anchor templates to just those regions of low variance, the amount of time needed to generate image anchor templates is reduced. The rationale behind this is that low variance regions tend to correspond to regions that don't vary between document images of a class, whereby they're intrinsically understood as having a higher likelihood of providing good anchor points.

Figure 12:
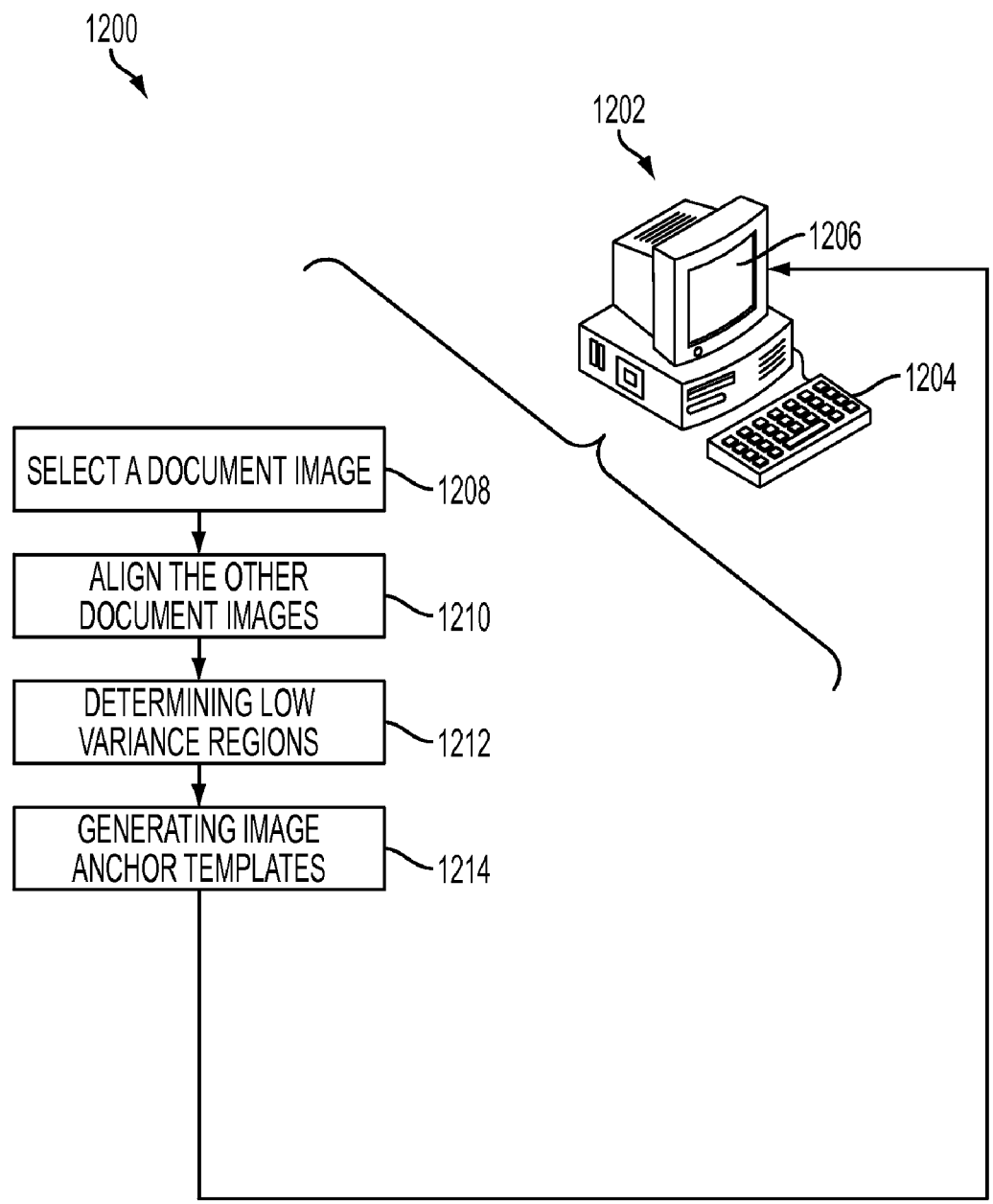
FIG. 12 illustrates an image anchor template generator employing the method of FIG. 1.

With reference to FIG. 12, an image anchor template (IAT) generator 1200 employing the method FIG. 1 is illustrated. Suitably, a computer 1202 or other digital processing device, including storage and a digital processor, such as a microprocessor, microcontroller, graphic processing unit (GPU), etc., embody the IAT generator 1200. In other embodiments, the IAT generator 1200 is embodied by a server including a digital processor and including or having access to digital data storage, such server being suitably accessed via the Internet or a local area network, or by a personal data assistant (PDA) including a digital processor and digital data storage, or so forth.

The computer or other digital processing device suitably includes or is operatively connected with one or more user input devices such as an illustrated keyboard 1204 for receiving user input to control the IAT generator 1200, and further includes or is operatively connected with one or more display devices such as an illustrated display 1206 for displaying output generated based on the output of the IAT generator 1200. In other embodiments, the input for controlling the IAT generator 1200 is received from another program running previously to or concurrently with the IAT generator 1200 on the computer 1202, or from a network connection, or so forth. Similarly, in other embodiments the output may serve as input to another program running subsequent to or concurrently with the IAT generator 1200 on the computer, or may be transmitted via a network connection, or so forth.

The IAT generator 1200 includes a selection module 1208, an alignment module 1210, a variance module 1212 and an image anchor template module 1214. During operation, the selection module 1208 receives a collection of document images from a source external to the IAT generator 1200. The source may be, for example, a database, another program, the operator, etc. The selection module 1208 then selects a document image from the collection of document images as described in connection with Action 102 of FIG. 1. The alignment module 1210 then receives the selection and the collection of document images from the selection module 1208 and aligns the document images of the collection to the selected document image as described in connection with Action 104 of FIG. 1. The variance module 1212 takes the aligned document images and the selected document image and determines low variance regions between the selected document image and the other document images according to Action 106 of FIG. 1. At this point, the image anchor template module 1214 generates image anchor templates from the low variance regions determined by the variance module 1212 according to Action 108 of FIG. 1.

With respect to the alignment module 1210, in certain embodiments where the alignment module 1210 performs global alignment, the alignment module 1210 includes a sub-region selection module (not shown), a match module (not shown), an analysis module (not shown), and a transformation module (not shown), where the foregoing modules correspondingly carry out Actions 202 through 208 of FIG. 2. Additionally, or in the alternative, in certain embodiments where the alignment module 1210 performs local alignment, the alignment module includes a partition module (not shown), a search module (not shown), a displacement computing module (not shown), a translation module (not shown), and a stitch module (not shown), where the foregoing modules correspondingly carry out Actions 502 through 510 of FIG. 5.

With respect to the image anchor template module 1212, in certain embodiments, the image anchor template module 1212 generates image anchor templates using the image anchor template generating function 900 of FIG. 9. Under such embodiments, the image anchor template module 1212 includes a generator module (not shown), a template scoring module (not shown), a ranking module (not shown) and a selection module (not shown), where the foregoing modules correspondingly carry out Actions 902 through 908 of FIG. 9. Under some of these embodiments, the image anchor template module 1212 further includes a termination module (not shown), which carries out Action 910 of FIG. 9. In other embodiments, the image anchor template module 1212 generates image anchor templates using the image anchor template generating function 1100 of FIG. 11. Under such embodiments, the image anchor template module 1212 includes a generator module (not shown), a template scoring module (not shown), a ranking module (not shown) and a selection module (not shown), where the foregoing modules correspondingly carry out Actions 1102 through 1108 of FIG. 11. Under some of these embodiments, the image anchor template module 1212 further includes a boundary module (not shown) and/or a termination module (not shown), where these modules carry out Actions 1110 and 1112 of FIG. 11, respectively.

Figure 13:
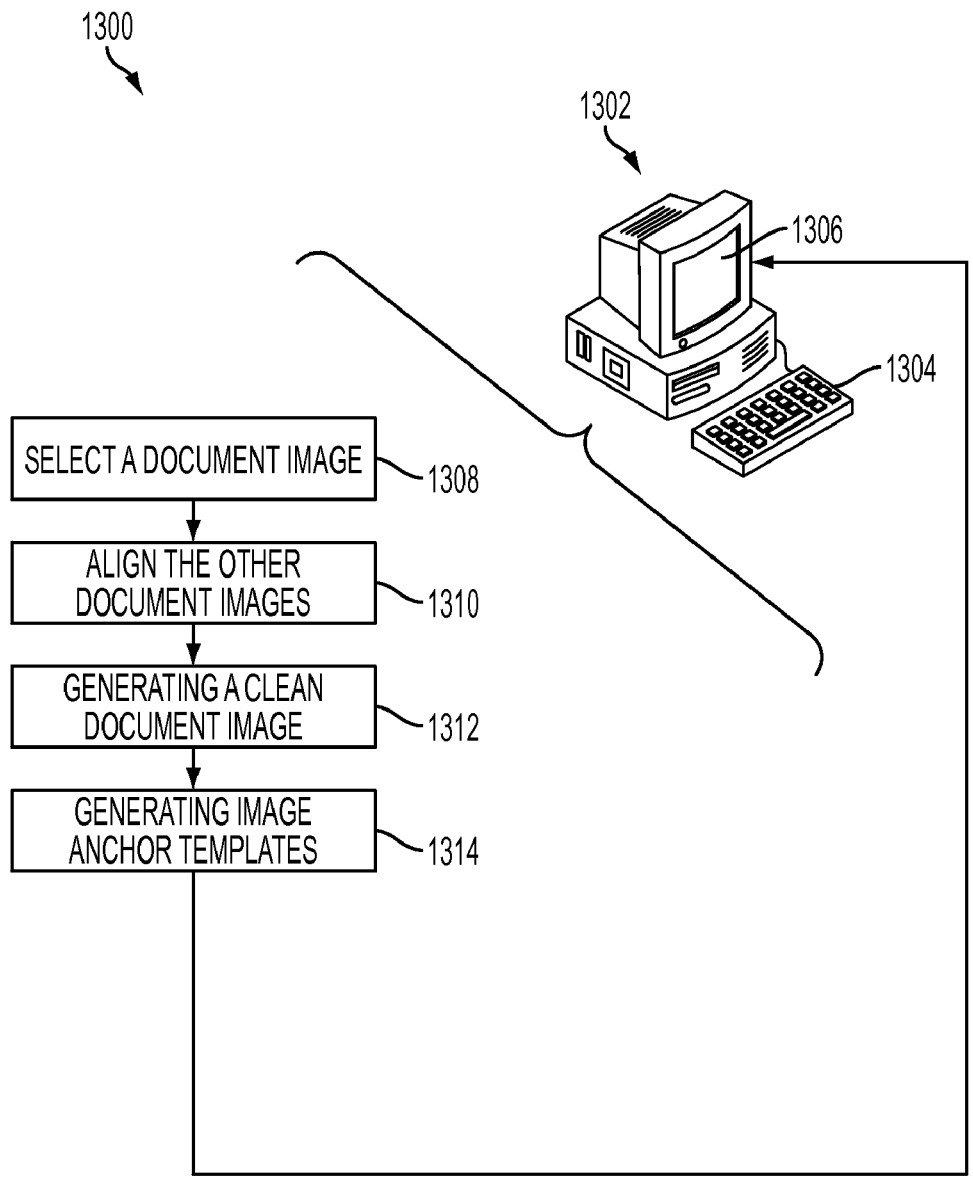
FIG. 13 illustrates an image anchor template generator employing the method of FIG. 7.

With reference to FIG. 13, an image anchor template (IAT) generator 1300 employing the method FIG. 7 is illustrated. Suitably, a computer 1302 or other digital processing device, including storage and a digital processor, such as a microprocessor, microcontroller, graphic processing unit (GPU), etc., embody the IAT generator 1300. In other embodiments, the IAT generator 1300 is embodied by a server including a digital processor and including or having access to digital data storage, such server being suitably accessed via the Internet or a local area network, or by a personal data assistant (PDA) including a digital processor and digital data storage, or so forth.

The computer or other digital processing device suitably includes or is operatively connected with one or more user input devices such as an illustrated keyboard 1304 for receiving user input to control the IAT generator 1300, and further includes or is operatively connected with one or more display devices such as an illustrated display 1306 for displaying output generated based on the output of the IAT generator 1300. In other embodiments, the input for controlling the IAT generator 1300 is received from another program running previously to or concurrently with the IAT generator 1300 on the computer 1302, or from a network connection, or so forth. Similarly, in other embodiments the output may serve as input to another program running subsequent to or concurrently with the IAT generator 1300 on the computer, or may be transmitted via a network connection, or so forth.

The IAT generator 1300 includes a selection module 1308, an alignment module 1310, a cleaning module 1312 and an image anchor template module 1314. During operation, the selection module 1308 receives a collection of document images from a source external to the IAT generator 1300. The source may be, for example, a database, another program, the operator, etc. The selection module 1308 then selects a document image from the collection of document images as described in connection with Action 702 of FIG. 7. The alignment module 1310 then receives the selection and the collection of document images from the selection module 1308 and aligns the document images of the collection to the selected document image as described in connection with Action 704 of FIG. 7. The cleaning module 1312 then takes the aligned document images and the selected document image and generates a clean document image according to Action 706 of FIG. 7. At this point, the image anchor template module 1314 generates image anchor templates from the clean document image determined by the clean module 1312 according to Action 708 of FIG. 7.

With respect to the alignment module 1310, in certain embodiments where the alignment module 1310 performs global alignment, the alignment module 1310 includes a sub-region selection module (not shown), a match module (not shown), an analysis module (not shown), and a transformation module (not shown), where the foregoing modules correspondingly carry out Actions 202 through 208 of FIG. 2. Additionally, or in the alternative, in certain embodiments where the alignment module 1310 performs local alignment, the alignment module includes a partition module (not shown), a search module (not shown), a displacement computing module (not shown), a translation module (not shown), and a stitch module (not shown), where the foregoing modules correspondingly carry out Actions 502 through 510 of FIG. 5.

With respect to the image anchor template module 1312, in certain embodiments, the image anchor template module 1312 generates image anchor templates using the image anchor template generating function 900 of FIG. 9. Under such embodiments, the image anchor template module 1312 includes a generator module (not shown), a template scoring module (not shown), a ranking module (not shown) and a selection module (not shown), where the foregoing modules correspondingly carry out Actions 902 through 908 of FIG. 9. Under some of these embodiments, the image anchor template module 1312 further includes a termination module (not shown), which carries out Action 910 of FIG. 9. In other embodiments, the image anchor template module 1312 generates image anchor templates using the image anchor template generating function 1100 of FIG. 11. Under such embodiments, the image anchor template module 1312 includes a generator module (not shown), a template scoring module (not shown), a ranking module (not shown) and a selection module (not shown), where the foregoing modules correspondingly carry out Actions 1102 through 1108 of FIG. 11. Under some of these embodiments, the image anchor template module 1312 further includes a boundary module (not shown) and/or a termination module (not shown), where these modules carry out Actions 1110 and 1112 of FIG. 11, respectively.

Figure 14:
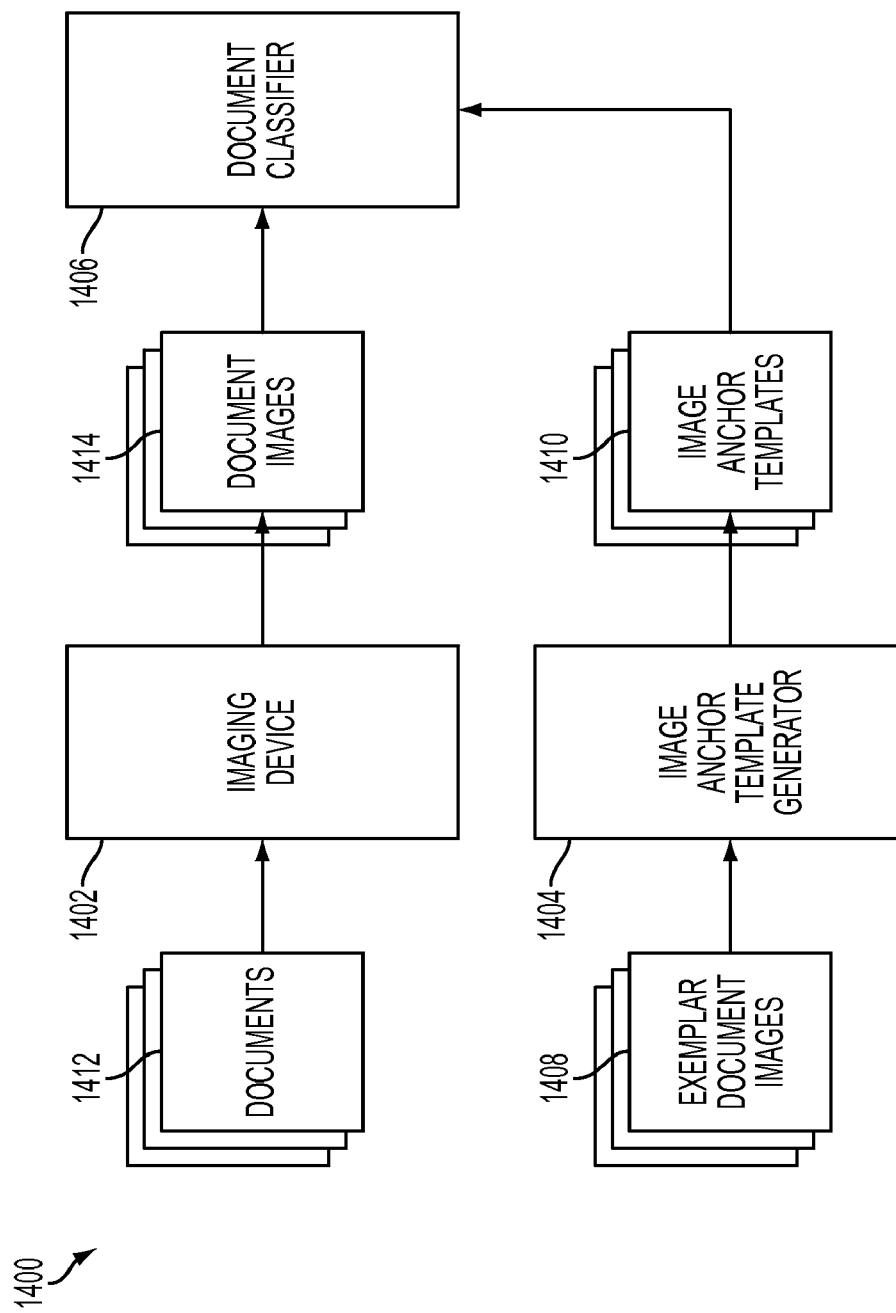
FIG. 14 illustrates a document classification system having an image anchor template generator.

With reference to FIG. 14, a document classification system 1400 using an IAT generator is illustrated. The system 1400 includes an imaging device 1402, an image anchor template generator 1404 and a document classifier 1406. The imaging device 1402 converts a document, such as a form, into a document image and may be a camera, scanner, or other like device. In certain embodiments, the image anchor template generator 1404 is the IAT generator 1200 of FIG. 12 or the IAT generator 1300 of FIG. 13. The document classifier 1406 classifies a document image of a document using image anchor templates.

Before the classification of documents can begin, exemplar document images 1408 are provided to the image anchor template generator 1404. At a minimum, positive exemplar document images are provided to the image anchor template generator 1404. However, depending upon the implementation, negative exemplar document images may also be provided to the image anchor template generator 1404. In certain embodiments, the operator of the system 1400 manually classifies the exemplar document images 1408. Thereafter, the image anchor template generator 1404 takes the exemplar document images 1408 and generates image anchor templates 1410.

After the image anchor templates 1410 are generated, the system 1400 begins classifying documents. Namely, the scanning device 1402 receives one or more documents 1412 and converts them to document images 1414. In certain embodiments, the documents 1412 are loaded into a feed tray of a printing device and passed through the imaging device 1402 via a conveyor path.

The document images 1414 are then passed to the document classifier 1406 and the document classifier 1406 uses the image anchor templates 1410 from the image anchor template generator 1404 to classify the document images 1414. The document images 1414 may be passed to the document classifier 1406 contemporaneously with the conversion of the documents 1412 or after all the documents 1412 are converted. In certain embodiments, the document classifier 1406 uses the image anchor templates 1410 as input to a binary or multicategory document classifier function.

Once the document classifier 1406 classifies the documents 1412, the documents 1412 and/or the document images 1414 are processed as necessary. For example, the documents 1412 may be routed via conveyer paths to a destination based upon their classification. Alternatively, or in addition, the document images 1412 may be stored in a database and/or stored within a file system according to their classification.

Figure 15:
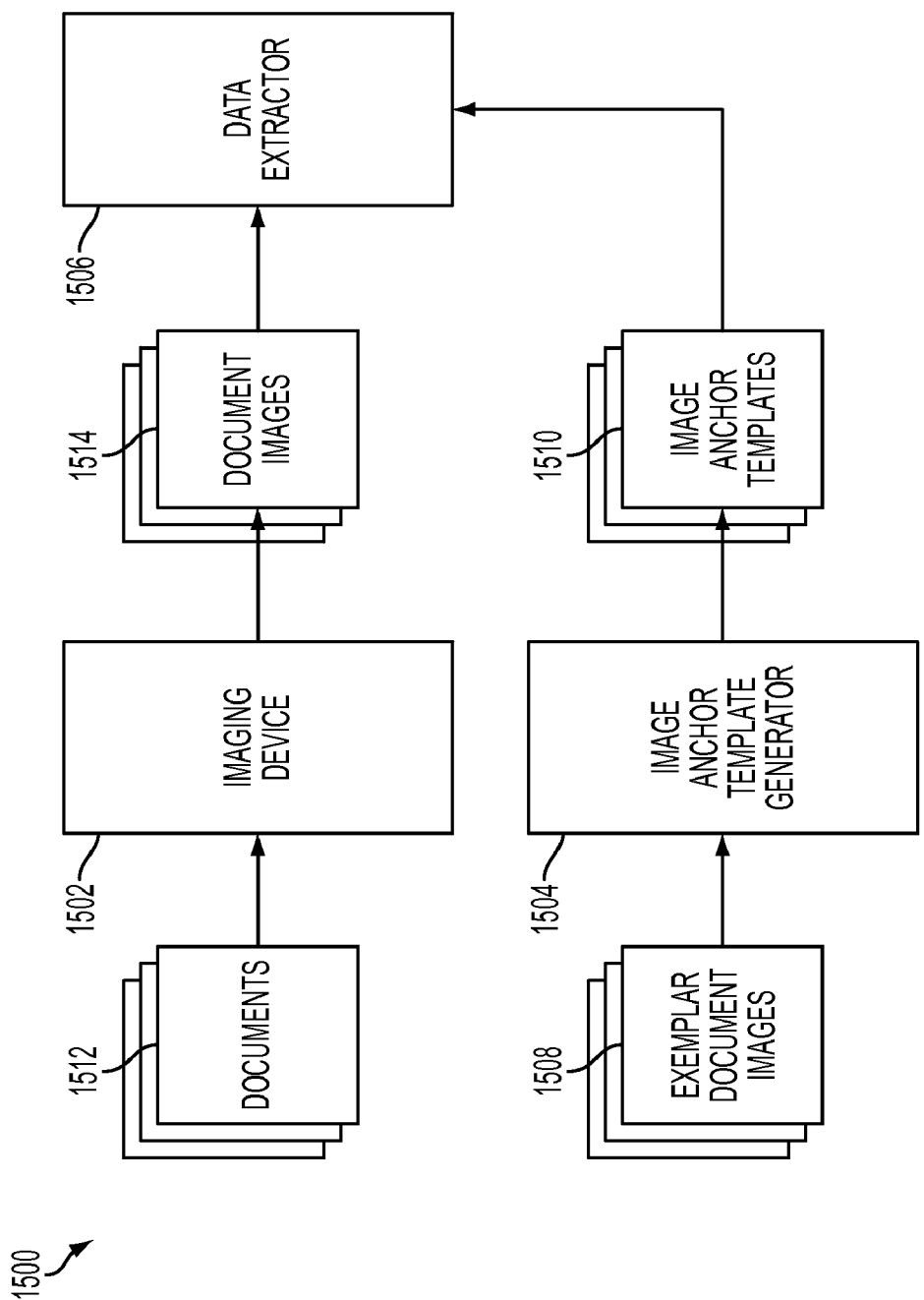
FIG. 15 illustrates a data extraction system having an image anchor template generator.

With reference to FIG. 15, the use of a data extraction system 1500 is illustrated. The system 1500 includes an imaging device 1502, an image anchor template generator 1504 and a data extractor 1506. The imaging device 1502 converts a document, such as a form, into a target image and may be a camera, scanner, or other like device. In certain embodiments, the image anchor template generator 1504 is the IAT generator 1200 of FIG. 12 or the IAT generator 1300 of FIG. 13. The data extractor 1506 extracts data from a target image of a document using image anchor templates.

Before the classification of documents can begin, exemplar document images 1508 are provided to the image anchor template generator 1504. At a minimum, positive exemplar document images are provided to the image anchor template generator 1504 having the data field labeled thereon. However, depending upon the image anchor template scoring function used, negative exemplar document images may also be provided to the image anchor template generator. In certain embodiments, the operator of the system 1500 manually identifies the data field within the exemplar document images. Thereafter, the image anchor template generator 1504 takes the exemplar document images 1508 and generates image anchor templates 1510.

After the image anchor templates are generated 1510, the system 1500 begins extracting data from documents. Namely, the scanning device 1502 receives one or more documents 1512 and converts them to document images 1514. In certain embodiments, the documents 1512 are loaded into a feed tray of a printing device and passed through the imaging device 1502 via a conveyor path.

The document images 1514 are then passed to the data extractor 1506 and the data extractor 1506 uses the image anchor templates 1510 from the image anchor template generator 1504 to locate the data field within the document images 1514 and extract the corresponding data. The document images 1514 may be passed to the data extractor 1506 contemporaneously with the conversion of the documents 1512 or after all the documents 1512 are converted.

Once the data extractor 1506 has attempted to extract data from the documents 1512, the documents 1512 and/or the document images 1514 are processed as necessary. For example, the documents 1512 may be routed via conveyer paths to a destination based upon whether data was extracted. Alternatively, or in addition, the document images 1512 may be stored in a database and/or stored within a file system according to whether data was extracted. Beyond the document images 1514 and the documents 1512, extracted data may be stored to a database, such as a SQL database, a relational database, etc.

In view of the discussion heretofore, in some embodiments, the exemplary methods, the IAT generator employing the same, and so forth, of the present invention are embodied by a storage medium storing instructions executable (for example, by a digital processor) to implement the determination of image anchor templates. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Further, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of generating image anchor templates from low variance regions of document images of a first class, wherein the document images of the first class is a collection of document images of a same type, said method comprising:
   selecting a document image from the document images of the first class; aligning the other document images of the first class to the selected document image, the aligning comprising:
      selecting a plurality of sub-regions from each of the other document images;
      determining a best match in the selected document for each of the selected sub-regions of the each of the other document images;
      determining a transformation for the each of the other document images using a least squares analysis to minimize the difference between the best matches of the selected sub-regions of the each of the other document images and the selected sub-regions of the each of the other document images; and
      transforming the each of the other document images according to the determined transformation of the each of the other document images;
   determining the low variance regions by comparing the aligned document images and the selected document image, wherein the low variance regions are those regions that vary little between the selected document image and other document images; and
   generating image anchor templates from the determined low variance regions, wherein the method is performed using at least one digital processor.

2. The method of claim 1, wherein the selected document image is higher quality than the other document images.

3. The method of claim 1, the determining the best match of the each of the selected sub-regions of the each of the other document images comprising:
   searching for the best match of the each of the selected sub-regions of the each of the other document images by correlating pixels in the each of the selected sub-regions of the each of the other document images with pixels in a corresponding portion in the selected document image.

4. The method of claim 1, wherein the determining the best match of the each of the selected sub-regions of the each of the other document images is performed using a hierarchical search procedure.

5. A method of generating image anchor templates from low variance regions of document images of a first class, wherein the document images of the first class is a collection of document images of a same type, said method comprising:
   electing a document image from the document images of the first class;
   aligning the other document images of the first class to the selected document image, the aligning comprising:
      defining each of the other document images as an ensemble of blocks, wherein each of the blocks of the ensemble of blocks of the each of the other document images includes neighbors;
      determining a best match in the selected document image for the each of the blocks of the ensemble of blocks of the each of the other document images, wherein the best match of the each of the blocks of the ensemble of blocks of the each of the other document images includes a match score;
      determining a translation vector for the each of the blocks of the ensemble of blocks of the each of the other document images; and
      shifting the each of the blocks of the ensemble of blocks of the each of the other document images by the translation vector of the each of the blocks of the ensemble of blocks of the each of the other document images to define aligned documents;
   determining the low variance regions by comparing the aligned document images and the selected document image, wherein the low variance regions are those regions that vary little between the selected document image and other document images; and
   generating image anchor templates from the determined low variance regions, wherein the method is performed using at least one digital processor.

6. The method of claim 5, the aligning further comprising:
   dilating foreground pixels for the each of the blocks of the ensemble of blocks of the each of the other document images.

7. The method of claim 5, the aligning further comprising:
   determining whether the match score of the best match of the each of the blocks of the ensemble of blocks of the each of the other document images exceeds a confidence threshold, wherein the translation vector of the each of the blocks of the ensemble of blocks of the each of the other document images is extrapolated from the translation vectors of neighboring blocks if the match score fails to exceed the confidence threshold.

8. The method of claim 5, the determining the best match of the each of the blocks of the ensemble of blocks of the each of the other document images comprising:
   searching for the best match of the each of the blocks of the ensemble of blocks of the each of the other document images by correlating pixels in the each of the blocks of the ensemble of blocks of the each of the other document images with pixels in a corresponding portion in the selected document image.

9. The method of claim 1, wherein the determined low variance regions are at least a predefined distance from high variance regions.

10. A method of generating image anchor templates from low variance regions of document images of a first class, said method comprising:
   selecting a document image from the document images of the first class, wherein the document images of the first class is a collection of document images of a same type;
   aligning the other document images of the first class to the selected document image;
   determining the low variance regions by comparing the aligned document images and the selected document image; and
   generating image anchor templates from the determined low variance regions, wherein the generated image anchor templates (i) facilitate discrimination between the document mages of the first class and document images of other classes, or (ii) facilitate data extraction from a data field of the document images of the first class, the generating image anchor templates comprising:
generating one or more candidate image anchor templates using one or more seed image anchor templates and/or at least one of the low variance regions;
determining a quality score for each of the one or more candidate image anchor templates and (i) the document images of the first class, or (ii) known locations of the data field within the document image;
ranking the one or more candidate image anchor templates according to quality score; and
selecting one or more of the most highly ranked image anchor templates;
wherein the method is performed using at least one digital processor.

11. A method of generating image anchor templates from a clean document image generated from document images of a first class, wherein the document images of the first class is a collection of document images of a same type, wherein the document images of the first class is a collection of document images of a same type, said method comprising:
selecting a document image from the document images of the first class;
aligning the other document images of the first class to the selected document image;
generating the clean document image by combining the aligned document images and the selected document image;
identifying large salient structures in the clean document image; and
generating image anchor templates from the clean document image, wherein the image anchor templates are generated from the identified salient structures and wherein the method is performed using at least one digital processor.

12. The method of claim 11, the generating the clean document age comprising:
summing the aligned document images and the selected document image pixel-wise to define a collection of summations, where each of the summations of the collection of summations corresponds to a pixel location;
filtering the collection of summations, wherein summations of the collection exceeding a threshold are assigned a black pixel, wherein summations of the collection less than the threshold are assigned a white pixel; and
generating the clean document image from the pixels and the pixel locations assigned to the each of the summations of the collection of summations.

13. The method of claim 12, wherein the summing gives additional weight to at least one of the selected document image and the aligned document images.

14. A system carried on a computer readable medium, of generating image anchor templates from low variance regions of document images of a first class, wherein the document images of the first class is a collection of document images of a same type, said system comprising:
a selection module that selects a document image from the document images of the first class;
an alignment module that aligns the other document images of the class to the selected document image, the alignment module comprising:
a sub-region selection module that selects a plurality of sub-regions from each of the other document images;
a match module that determines a best match in the selected document for each of the selected sub-regions of the each of the other document images;
an analysis module that determines a transformation for the each of the other document images using a least squares analysis to minimize the difference between the best matches of the selected sub-regions of the each of the other document images and the selected sub-regions of the each of the other document images; and
a transformation module that transform the each of the other document images according to the determined transformation of the each of the other document images;
a variance module that determines the low variance regions by comparing the aligned document images and the selected document image, wherein the low variance regions are those regions that vary little between the selected document image and other document images; and
an image anchor template module that generates image anchor templates from the determined low variance regions.

15. The system of claim 14, wherein the determining the best match of the each of the selected sub-regions of the each of the other document images is performed using a hierarchical search procedure.

16. A system carried on a computer readable medium, of generating image anchor templates from low variance regions of document images of a first class, wherein the document images of the first class is a collection of document images of a same type, wherein the document images of the first class is a collection of document images of a same type, said system comprising:
a selection module that selects a document image from the document images of the first class;
an alignment module that aligns the other document images of the first class to the selected document image, the alignment module comprising:
a partition module that defines each of the other document images as an ensemble of blocks, wherein each of the blocks of the ensemble of blocks of the each of the other document images includes neighbors;
a search module that determines a best match in the selected document image for the each of the blocks of the ensemble of blocks of the each of the other document images, wherein the best match of the each of the blocks of the ensemble of blocks of the each of the other document images includes a match score;
a displacement computing module that determines a translation vector for the each of the blocks of the ensemble of blocks of the each of the other document images; and
a translation module that shifts the each of the blocks of the ensemble of blocks of the each of the other document images by the translation vector to define aligned documents;
a variance module that determines the low variance regions by comparing the aligned document images and the selected document image, wherein the low variance regions are those regions that vary little between the selected document image and other document images; and
an image anchor template module that generates image anchor templates from the determined low variance regions.

* * * * *